US012664445B2

(12) United States Patent
Robinson et al.

(10) Patent No.: US 12,664,445 B2
(45) Date of Patent: Jun. 23, 2026

(54) PREDICTIVE DATA ANALYSIS IN CONCEPTUALLY HIERARCHICAL DOMAINS

(71) Applicant: Optum, Inc., Minnetonka, MN (US)

(72) Inventors: Jason Robinson, La Jolla, CA (US); Mariya Wahlstrom, Escondido, CA (US); Ellyn Oliver, San Diego, CA (US); Michael Pedersen, San Diego, CA (US); Mark Messer, Escondido, CA (US); Brian C. Potter, Carlsbad, CA (US); Kelly Canter, Roscommon, MI (US); Mark L. Morsch, San Diego, CA (US)

(73) Assignee: Optum, Inc., Minnetonka, MN (US)

( * ) Notice: Subject to any disclaimer, the term of this patent is extended or adjusted under 35 U.S.C. 154(b) by 991 days.

(21) Appl. No.: 16/538,129

(22) Filed: Aug. 12, 2019

(65) Prior Publication Data

US 2021/0049481 A1 Feb. 18, 2021

(51) Int. Cl.
*G06N 5/04* (2023.01)
*G06N 5/02* (2023.01)

(52) U.S. Cl.
CPC ................. *G06N 5/04* (2013.01); *G06N 5/02* (2013.01)

(58) Field of Classification Search
USPC .............................. 706/11, 45; 707/778, 705
See application file for complete search history.

(56) References Cited

U.S. PATENT DOCUMENTS

| | | | |
|---|---|---|---|
| 3,996,672 A | 12/1976 | Osofsky et al. | |
| 5,307,262 A | 4/1994 | Ertel | |
| 5,325,293 A | 6/1994 | Dorne | |

(Continued)

FOREIGN PATENT DOCUMENTS

| | | |
|---|---|---|
| WO | 2004/055783 A2 | 7/2004 |
| WO | 2006/014845 A2 | 2/2006 |

(Continued)

OTHER PUBLICATIONS

Saarinen, Adaptive real-time anomaly detection for multi-dimensional streaming data, Master's Thesis, Aalto University, 2017, pp. 1-91 (Year: 2017).*

(Continued)

*Primary Examiner* — Michael H Hoang

(74) *Attorney, Agent, or Firm* — Alston & Bird LLP

(57) ABSTRACT

There is a need for solutions for more effective and efficient predictive data analysis systems in conceptually hierarchical domains. This need can be addressed, for example, by a system configured to obtain one or more initial raw inputs; determine a partial prediction for the one or more initial raw inputs, wherein the partial prediction is associated with an initial encoding hierarchy and the initial encoding hierarchy is associated with a plurality of prediction nodes; determine, based on the partial prediction and the initial encoding hierarchy, one or more partial prediction information deficiencies for partial prediction; obtain one or more supplemental raw inputs based on the one or more partial prediction information deficiencies; and generate a conceptually hierarchical prediction based on the one or more supplemental raw inputs and the partial prediction.

24 Claims, 9 Drawing Sheets

(56) References Cited

U.S. PATENT DOCUMENTS

| | | |
|---|---|---|
| 5,483,443 A | 1/1996 | Milstein et al. |
| 5,583,758 A | 12/1996 | McIlroy et al. |
| 5,594,638 A | 1/1997 | Iliff |
| 5,619,709 A | 4/1997 | Caid et al. |
| 5,675,819 A | 10/1997 | Schuetze |
| 5,680,511 A | 10/1997 | Baker et al. |
| 5,778,157 A | 7/1998 | Oatman et al. |
| 5,794,178 A | 8/1998 | Caid et al. |
| 5,809,476 A | 9/1998 | Ryan |
| 5,873,056 A | 2/1999 | Liddy et al. |
| 5,900,871 A | 5/1999 | Atkin et al. |
| 5,963,894 A | 10/1999 | Richardson et al. |
| 5,995,955 A | 11/1999 | Oatman et al. |
| 6,055,494 A | 4/2000 | Friedman |
| 6,081,774 A | 6/2000 | De et al. |
| 6,137,911 A | 10/2000 | Zhilyaev |
| 6,182,029 B1 | 1/2001 | Friedman |
| 6,389,405 B1 | 5/2002 | Oatman et al. |
| 6,498,982 B2 | 12/2002 | Bellesfield et al. |
| 6,529,876 B1 | 3/2003 | Dart et al. |
| H2098 H | 3/2004 | Morin |
| 6,708,186 B1 | 3/2004 | Claborn et al. |
| 6,866,510 B2 | 3/2005 | Polanyi et al. |
| 6,915,253 B1 | 7/2005 | Chapman |
| 6,915,254 B1 | 7/2005 | Heinze et al. |
| 6,980,875 B1 | 12/2005 | Stromberg |
| 7,043,426 B2 | 5/2006 | Roberge et al. |
| 7,113,905 B2 | 9/2006 | Parkinson et al. |
| 7,174,507 B2 | 2/2007 | Baudin et al. |
| 7,260,480 B1 | 8/2007 | Brown et al. |
| 7,359,861 B2 | 4/2008 | Lee |
| 7,360,151 B1 | 4/2008 | Froloff |
| 7,369,998 B2 | 5/2008 | Sarich et al. |
| 7,401,077 B2 | 7/2008 | Bobrow et al. |
| 7,493,253 B1 | 2/2009 | Ceusters et al. |
| 7,493,326 B2 | 2/2009 | Bishop et al. |
| 7,516,125 B2 | 4/2009 | Rao et al. |
| 7,610,190 B2 | 10/2009 | Polanyi et al. |
| 7,624,027 B1 | 11/2009 | Stern et al. |
| 7,653,641 B2 | 1/2010 | Theissen et al. |
| 7,720,723 B2 | 5/2010 | Dicker et al. |
| 7,725,330 B2 | 5/2010 | Rao et al. |
| 7,827,165 B2 | 11/2010 | Abernethy et al. |
| 7,865,358 B2 | 1/2011 | Green et al. |
| 7,908,552 B2 | 3/2011 | Heinze et al. |
| 7,949,538 B2 | 5/2011 | Heinze |
| 8,078,454 B2 | 12/2011 | Pouzin |
| 8,140,323 B2 | 3/2012 | Johnson et al. |
| 8,423,370 B2 | 4/2013 | Heinze |
| 8,438,496 B1 | 5/2013 | Hegde |
| 8,548,795 B2 | 10/2013 | Anisimovich et al. |
| 8,655,668 B2 | 2/2014 | Heinze |
| 8,682,823 B2 | 3/2014 | Heinze et al. |
| 8,719,703 B2 | 5/2014 | Bier |
| 8,731,954 B2 | 5/2014 | Heinze et al. |
| 8,898,798 B2 | 11/2014 | Rogers et al. |
| 9,063,924 B2 | 6/2015 | Heinze et al. |
| 9,110,756 B1 | 8/2015 | Guo et al. |
| 9,804,772 B2 | 10/2017 | Oh et al. |
| 9,946,846 B2 | 4/2018 | Morsch et al. |
| 10,133,727 B2 | 11/2018 | Karres et al. |
| 10,552,931 B2 | 2/2020 | Sheffer et al. |
| 2002/0010714 A1 | 1/2002 | Hetherington |
| 2002/0035581 A1 | 3/2002 | Reynar et al. |
| 2002/0085040 A1 | 7/2002 | Krolczyk et al. |
| 2002/0128819 A1 | 9/2002 | Jessee et al. |
| 2002/0156810 A1 | 10/2002 | Holland et al. |
| 2003/0018251 A1 | 1/2003 | Solomon |
| 2003/0033347 A1 | 2/2003 | Bolle et al. |
| 2003/0115039 A1 | 6/2003 | Wang |
| 2003/0115195 A1 | 6/2003 | Fogel et al. |
| 2003/0217052 A1 | 11/2003 | Rubenczyk et al. |
| 2004/0059577 A1 | 3/2004 | Pickering |
| 2004/0064808 A1 | 4/2004 | Kira |
| 2004/0093293 A1 | 5/2004 | Cheung |
| 2004/0117206 A1 | 6/2004 | Steinberger et al. |
| 2004/0117734 A1 | 6/2004 | Krickhahn |
| 2004/0172297 A1 | 9/2004 | Rao et al. |
| 2004/0249638 A1 | 12/2004 | Wang |
| 2004/0254816 A1 | 12/2004 | Myers |
| 2005/0010421 A1 | 1/2005 | Watanabe et al. |
| 2005/0071185 A1 | 3/2005 | Thompson |
| 2005/0091067 A1 | 4/2005 | Johnson |
| 2005/0137910 A1 | 6/2005 | Rao et al. |
| 2005/0261910 A1 | 11/2005 | Precoda et al. |
| 2005/0273361 A1 | 12/2005 | Busch |
| 2006/0020444 A1 | 1/2006 | Cousineau et al. |
| 2006/0020447 A1 | 1/2006 | Cousineau et al. |
| 2006/0020465 A1 | 1/2006 | Cousineau et al. |
| 2006/0020466 A1 | 1/2006 | Cousineau et al. |
| 2006/0020492 A1 | 1/2006 | Cousineau et al. |
| 2006/0020493 A1 | 1/2006 | Cousineau et al. |
| 2006/0059021 A1 | 3/2006 | Yulman et al. |
| 2006/0129922 A1 | 6/2006 | Walker |
| 2006/0134750 A1 | 6/2006 | Liu et al. |
| 2006/0149565 A1 | 7/2006 | Riley |
| 2006/0247949 A1 | 11/2006 | Shorrosh |
| 2007/0027845 A1 | 2/2007 | Dettinger et al. |
| 2007/0061348 A1 | 3/2007 | Holland et al. |
| 2007/0094030 A1 | 4/2007 | Xu |
| 2007/0226211 A1 | 9/2007 | Heinze et al. |
| 2007/0237377 A1 | 10/2007 | Oosawa |
| 2007/0294200 A1 | 12/2007 | Au |
| 2008/0004505 A1 | 1/2008 | Kapit et al. |
| 2008/0222518 A1 | 9/2008 | Walker |
| 2008/0256108 A1 | 10/2008 | Heinze et al. |
| 2008/0256329 A1 | 10/2008 | Heinze et al. |
| 2008/0282153 A1 | 11/2008 | Kindeberg et al. |
| 2009/0055477 A1 | 2/2009 | Flesher et al. |
| 2009/0070140 A1 | 3/2009 | Morsch et al. |
| 2009/0144617 A1 | 6/2009 | Funes et al. |
| 2009/0175550 A1 | 7/2009 | Taleb |
| 2010/0064131 A1 | 3/2010 | Spatscheck et al. |
| 2010/0070517 A1 | 3/2010 | Ghosh et al. |
| 2010/0082673 A1 | 4/2010 | Nakano et al. |
| 2010/0195909 A1 | 8/2010 | Wasson et al. |
| 2010/0257444 A1 | 10/2010 | Bever et al. |
| 2011/0093479 A1 | 4/2011 | Fuchs |
| 2011/0167074 A1 | 7/2011 | Heinze et al. |
| 2011/0307521 A1 | 12/2011 | Slezak et al. |
| 2012/0011084 A1 | 1/2012 | Gulwani et al. |
| 2012/0011470 A1 | 1/2012 | Oh et al. |
| 2012/0014559 A1 | 1/2012 | Suehling et al. |
| 2012/0060216 A1 | 3/2012 | Chaudhri et al. |
| 2012/0109994 A1 | 5/2012 | Ju et al. |
| 2012/0136863 A1 | 5/2012 | Bobick et al. |
| 2012/0212337 A1 | 8/2012 | Montyne et al. |
| 2012/0239671 A1 | 9/2012 | Chaudhri et al. |
| 2012/0278102 A1 | 11/2012 | Johnson |
| 2013/0006653 A1 | 1/2013 | Mills |
| 2013/0086069 A1 | 4/2013 | Phillips |
| 2013/0103615 A1 | 4/2013 | Mun |
| 2013/0132308 A1 | 5/2013 | Boss et al. |
| 2013/0212508 A1 | 8/2013 | Barsoum et al. |
| 2013/0246480 A1 | 9/2013 | Lemcke et al. |
| 2013/0262125 A1 | 10/2013 | Tunstall-Pedoe |
| 2013/0297328 A1 | 11/2013 | Johnson et al. |
| 2014/0019128 A1 | 1/2014 | Riskin et al. |
| 2014/0019160 A1 | 1/2014 | Loya et al. |
| 2014/0074797 A1 | 3/2014 | Mcfarland |
| 2014/0074867 A1 | 3/2014 | Mcfarland |
| 2014/0129803 A1 | 5/2014 | Heinze et al. |
| 2014/0164388 A1 | 6/2014 | Zhang et al. |
| 2014/0257842 A1 | 9/2014 | Heinze et al. |
| 2014/0304473 A1 | 10/2014 | Zachariassen et al. |
| 2014/0337044 A1 | 11/2014 | Heinze |
| 2015/0066537 A1 | 3/2015 | Sheffer |
| 2015/0066539 A1 | 3/2015 | Sheffer et al. |
| 2016/0004825 A1 | 1/2016 | Martin et al. |
| 2017/0046425 A1 | 2/2017 | Tonkin et al. |
| 2018/0197261 A1 | 7/2018 | Morsch et al. |
| 2018/0293071 A1 | 10/2018 | Heinze et al. |
| 2018/0341636 A1 | 11/2018 | Heinze et al. |
| 2019/0057083 A1 | 2/2019 | Karres et al. |

(56)                    References Cited

U.S. PATENT DOCUMENTS

FOREIGN PATENT DOCUMENTS

| WO | 2006/014846 A2 | 2/2006 |
| WO | 2006/014847 A2 | 2/2006 |
| WO | 2006/014851 A1 | 2/2006 |
| WO | 2012/122122 A1 | 9/2012 |

OTHER PUBLICATIONS

Conca, An adaptive framework for classification of concept drift with limited supervision, Doctoral Thesis, The University of York, 2012, pp. 1-253 (Year: 2012).*

Bai, Tian, and Slobodan Vucetic. "Improving medical code prediction from clinical text via incorporating online knowledge sources." The World Wide Web Conference. 2019. https://dl.acm.org/doi/pdf/10.1145/3308558.3313485 (Year: 2019).*

United States Patent and Trademark Office, NonFinal Office Action for U.S. Appl. No. 16/425,391, filed Apr. 6, 2021, (17 pages), USA.

NonFinal Office Action for U.S. Appl. No. 16/719,093, dated Mar. 17, 2022, (69 pages), United States Patent and Trademark Office, USA.

Final Office Action for U.S. Appl. No. 16/425,391, filed Dec. 22, 2020, (41 pages), United States Patent and Trademark Office, USA.

"HL7 Clinical Document Architecture, Release 2.0," (190 pages), (online) [retrieved from the Internet Jan. 23, 2020] <http://xml.coverpages.org/CDA-20040830v3.pdf>.

"RAT-STATS 2010 Companion Manual, Version 1," Department of Health and Human Services , Office of Inspector General, Office of Audit Services, May 2010, (245 pages).

"RAT-STATS 2010 User Guide, Version 1," Department of Health and Human Services—Office of Inspector General, Office of Audit Services, May 2010, (394 pages).

"SNOMED CT Browsers," U.S. Department of Health & Human Services, (article), (online), (3 pages), [retrieved from the Internet Sep. 29, 2019] <https://www.nim.nih.gov/research/umls/Snomed/snomed_browsers.html>.

"Supercharged CDI: NLP, Intelligent Workflow and CAC Revolutionize CDI Program At UPMC", OPTUM, White Paper, Mar. 2013, (6 pages).

Aronow, David B. et al. "A PC Classifier of Clinical Text Documents: Advanced Information Retrieval Technology Transfer," Conference entitled American Medical Informatics Association: Beyond the Superhighway; Exploiting The Internet With Medical Informatics—Annual Fall Symposium, AMIA Annual Symposium, p. 932, Hanley & Belfus (1996).

Aronow, David B. et al. "Ad-Hoc Classification of Electronic Clinical Documents," D-Lib Magazine, Jan. 1997, pp. 1-8, Amherst, MA. [retrieved from the Internet Sep. 19, 2019] <URL: <http://www.dlib.org/dlib/january97/medica1/01aronow.html>.

Aronow, David B. et al. "Automated Identification of Episodes of Asthma Exacerbation for Quality Measurement in a Computer-Based Medical Record," Proceedings of the Annual Symposium on Computer Application In Medical Care, American Medical Informatics Association, Brookline, MA, pp. 309-313 (1995).

Corley Courtney et al. "Measuring the Semantic Similarity of Texts," Proceedings of the ACL Workshop On Empirical Modeling of Semantic Equivalence and Entailment, ACM 2005, pp. 13-18.

Department of Health and Human Services, "HIPPA Administrative Simplifications: Modification to Medical Data Code Set Standards To Adopt ICD-10-CM and ICD-10-PCS", Federal Register vol. 74, No. 11, Jan. 16, 2009/Rules and Regulations, (35 pages).

Department of Health and Human Services—OIG Office of Audit Services, "RAT-STATS User Guide," Sep. 2001, (108 pages).

Endicott, Melanie. "Innovations in CDI Automation," ICD-TEN Top Emerging News, May 2013, (2 pages).

Furuse, Osamu et al. "Constituent Boundary Parsing for Example-Based Machine Translation," Google 1994, pp. 105-111.

Giunchiglia, Fausto et al. "Approximate Structure-Preserving Semantic Matching," In OTM Confederated International Conferences, On the Move to Meaningful Internet Systems, pp. 1217-1234, (2008). Springer, Berlin, Heidelberg.

Heja, Gergely et al. "GALEN Based Formal Representation of ICD10," International Journal of Medical Informatics, Elsevier Scientific Publishers, Shannon, IR, vol. 76, No. 2-3, Feb. 10, 2007, pp. 118-123.

Hirsch, Morris et al. "Suggesting Terms for Query Expansion in a Medical Information Retrieval System," AMIA Annual Symposium on Computer Application in Medical Care, 1995, p. 965.

International Searching Authority, International Search Report and Written Opinion for International Application No. PCT/US2014/054329, Feb. 3, 2015, (11 pages), Rijswijk, The Netherlands.

International Searching Authority, International Search Report and Written Opinion for International Application No. PCT/US2014/058538, Feb. 4, 2015 (11 pages), Rijswijk, The Netherlands.

Jorg, Brigitte et al. "Modeling the Semantics of Contextual and Content-Specific Research Metadata Using Ontology Languages: Issues on Combining CERIF and OWL," Procedia Computer Science, vol. 9, Elsevier 2012, pp. 1563-1570.

Larkey, Leah S. et al. "Automatic Assignment of ICD9 Codes to Discharge Summaries," Technical Report, IR-64, Center for Intelligent Information Retrieval, (24 pages), University of Massachusetts, Amherst, MA (1995).

Lehnert, Wendy et al. "Inductive Text Classification for Medical Applications," Journal for Experimental and Theoretical Artificial Intelligence, vol. 7, No. 1, Jan. 1995, (39 pages).

Lenert, Leslie A. et al. "Automated Linkage of Free-Text Descriptions of Patients With A Practice Guideline," Proceedings of the Annual Symposium on Computer Application in Medical Care, pp. 274-278, (1993), American Medical Informatics Association.

Libicki, Martin et al. "The Costs and Benefits of Moving to the ICD-10 Code Sets," Tehnical Report, RAND Science and Technology, Mar. 2004, Santa Monica, CA. (85 pages).

Morsch, Mark. "Better Technology Leads To Better Coding," Optum, White Paper, (2012), (4 pages), Eden Prairie, MN.

Mullin, Robert. "A Brief History of ICD-10-PCS", Journal of AHIMA, vol. 70, No. 9 (1999), (3 pages).

Neubauer, Aljoscha Steffen. "The EWMA Control Chart," Clinical Chemistry, vol. 43, No. 4, pp. 594-601, (1997).

Ranum, David L. "Knowledge Based Understanding of Radiology Text," 12th Annual Symposium on Computer Application in Medical Care, pp. 141-145, (1988), Rochester Minnesota.

Richardson, Stephen D. et al. "MindNet: Acquiring and Structuring Semantic Information From Text," InProceedings of the 36th Annual Meeting of the Association for Computational Linguistics and 17th International Conference on Computational Linguistics—vol. 2, Aug. 10, 1998, pp. 1098-1102, Associate for Computational Linguistics.

Robert E. Nolan Company, "Replacing ICD-9-CM with ICD-10-CM and ICD-10-PCS: Challenges, Estimated Costs and Potential Benefits," Oct. 2003, (39 pages), Simsbury, Connecticut and Dallas, Texas.

Sager, Naomi et al. "Automatic Encoding Into Snomed III: A Preliminary Investigation," 18th Annual Symposium on Computer Application in Medical Care, pp. 230-234, (1994), New York, NY.

Sager, Naomi et al. "Natural Language Processing and the Representation of Clinical Data," Journal of American Medical Information Association, vol. 1, No. 2, pp. 142-160, Mar./Apr. 1994, New York, NY.

Shaikh, Mostafa Al Masum et al. "Assessing Sentiment of Text by Semantic Dependency and Contextual Valence Analysis," International Conference On Affective Computing and Intelligent Interaction, Sep. 12, 2007, pp. 191-202, Springer, Berlin, Heidelberg.

Sneiderman, Charles A. et al., "Finding the Findings: Identification of Findings In Medical Literature Using Restricted Natural Language Processing," In Proceedings of the AMIA Annual Fall Symposium, pp. 239-243, (1996), American Medical Informatics Association, National Library of Medicine, Bethesda, MD.

SNOMED—5 Step Briefing, SNOMED International, (2 pages), (online), [retrieved from the Internet Sep. 19, 2019] <https://www.snowmed.org/snomed-ct/five-step-briefing>.

(56)          References Cited

OTHER PUBLICATIONS

SNOMED Clinical Terms User Guide, Jan. 2010 International Release (US English), International Health Terminology Standards Development Organisation, (99 pages), [retrieved from the Internet Jan. 22, 2020] <https://confluence.ihtsdotools.org/download/attachments/18780048/UserGuide_Current-en-US_INT_20100131-significant-changes.pdf?api=v2>.

Soderland, Stephen et al. "Machine Learning of Text Analysis Rules for Clinical Records," Technical Report, TE-39, (5 pages), (1995), Department of Computer Science, University of Massachusetts.

Starosta, Stanley et al. "Lexicase Parsing: A Lexicon-driven Approach to Syntactic Analysis," In Coling 1986 vol. 1: The 11th International Conference on Computational Linguistics, 127-132, (1986).

Stoica, Emilia et al. "Nearly-Automated Metadata Hierarchy Creation," In Proceedings of HLT-NAACL 2004: Short Papers, (2004), pp. 117-120.

Varelas, Giannis et al. "Semantic Similarity Method in WordNet and Their Application to Information Retrieval on the Web," Proceedings of the 7th Annual ACM International Workshop On Web Information and Data Management, Jun. 30, 2005, (75 pages).

Wattenberg, Martin et al. "The Word Tree, An Interactive Visual Concordance," IEEE Transactions On Visualization and Computer Graphics, vol. 14, No. 6, Nov./Dec. 2008, pp. 1221-1228.

Yang, Yiming et al. "An Application of Least Squares Fit Mapping to Clinical Classification," 16th Annual Symposium on Computer Application in Medical Care, pp. 460-464, (1993), Rochester, Minnesota.

Zhou, Xiaohua et al. "Converting Semi-Structured Clinical Medical Records Into Information and Knowledge," Proceedings of the 21st International Conference On Data Engineering (ICDE '05), IEEE 2005, (8 pages).

"Using Coding Automation to Aid the Transition to ICD-10," Educational Report Sponsored by Optum, HFMA Healthcare Financial Management Association, pp. 1-8, Nov. 2011.

"Value Proposition for SNOMED CT," International Health Terminology Standards Development Organisation, (2 pages), (online), [Retrieved from the Internet Dec. 21, 2010] <www.ihtsdo.org/fileadmin/user.sub.-upload/Docs.sub.-01/Publications/SNO-MED.sub.-CT/SNOMED.sub.-CT.sub.--Benefits.sub.--v4.pdf>.

Aronow David B. et al. "Automated Classification of Encounter Notes in a Computer Based Medical Record," MEDINFO, 8 part 1, pp. 8-12, (1995).

Croft, W.B. et al. "Effective Access to Distributed Heterogeneous Medical Text Databases," MEDINFO, 8 Part 2, p. 1719, (1995).

Friedman, Carol et al. "Natural Language Processing In An Operational Clinical Information System," Natural Language Engineering, vol. 1, No. 1, pp. 83-108, (Mar. 1995).

Gregory, Tom. "Interpreting Error Rates in Health Care Billing Audits," Journal of Health Care Compliance, vol. 5, No. 1, pp. 4-8, Jan.-Feb. 2003.

Johnson, Kerry, "Revenue Cycle Strategist: Implementing ICD-10: A Canadian Perspective from the Front Line", Healthcare Financial Management Association, Feb. 2009. (8 pages).

Morsch, Mark et al. "Transitioning To ICD-10: Why You Can Trust NLP Technology With ICD-10 Coding," California Health Information Association 2013 Convention & Exhibit, pp. 1-30, Jun. 11, 2013.

Morsch, Mark. "Advanced Coding Technology To Advance The Revenue Cycle, Natural Language Processing With LifeCode," OptumInsight, pp. 1-4, (2011), Eden Prairie, MN.

Spackman, Kent. "SNOMED Clinical Terms Fundamentals," International Health Terminology Standards Development Organisation, (56 pages), Dec. 14, 2007, (online), [Retrieved from the Internet Dec. 21, 2010] <www.ihtsdo.org/fileadmin/user_upload/docs_01/SNOMED_Clinical_Terms_Fundamentals.pdf>.

Zingmond, David et al. "Monitoring Free-Text Data Using Medical Language Processing," Computers and Biomedical Research, vol. 26, pp. 467-481, (1993), Stanford, CA.

BR Office Action Mailed on Mar. 3, 2020 for BR Application No. 112016007163.

Final Rejection Mailed on Feb. 19, 2016 for U.S. Appl. No. 14/043,344.

Final Rejection Mailed on Mar. 2, 2017 for U.S. Appl. No. 14/043,344.

Non-Final Rejection Mailed on Aug. 14, 2015 for U.S. Appl. No. 14/043,344.

Non-Final Rejection Mailed on Jul. 14, 2017 for U.S. Appl. No. 14/043,344.

Non-Final Rejection Mailed on Mar. 8, 2018 for U.S. Appl. No. 14/043,344.

Non-Final Rejection Mailed on Sep. 23, 2016 for U.S. Appl. No. 14/043,344.

Notice of Allowance and Fees Due (PTOL-85) Mailed on Aug. 15, 2018 for U.S. Appl. No. 14/043,344.

Notice of Allowance and Fees Due (PTOL-85) Mailed on Jul. 13, 2018 for U.S. Appl. No. 14/043,344.

Raghav Bharadwaj, Artificial Intelligence for Medical Billing and Coding, Mar. 16, 2018, 38 pages, https://www.techemergence.com/artificial-intelligence-medical-billing-coding/, Aug. 2, 2018.

Richard Wolniewicz, PhD, Computer-assisted coding and natural language processing, copyright 2015, 3M Health Information Systems, 12 pages, https://static1.squarespace.com/static/57302e3040261d2ef98c91c0/1/573c13b81d07c003b4e2a430/1463555008957/3M_NLP_white_paper.pdf, Feb. 26, 2019.

Notice Of Allowance and Fee(s) Due for U.S. Appl. No. 16/425,391, dated Aug. 4, 2021, (23 pages), United States Patent and Trademark Office, USA.

Notice of Allowance and Fee(s) Due for U.S. Appl. No. 16/166,092, dated Nov. 22, 2021, (23 pages), United States Patent and Trademark Office, USA.

United States Patent and Trademark Office, NonFinal Office Action for U.S. Appl. No. 16/425,391, filed Sep. 29, 2020, (56 pages), USA.

United States Patent and Trademark Office, Final Office Action for U.S. Appl. No. 16/166,092, dated May 19, 2021, (16 pages), USA.

United States Patent and Trademark Office, NonFinal Office Action for U.S. Appl. No. 16/166,092, filed Oct. 27, 2020, (77 pages), U.S.

Notice of Allowance and Fee(s) Due for U.S. Appl. No. 16/719,093, dated Aug. 31, 2022, (5 pages), United States Patent and Trademark Office, US.

NonFinal Office Action for U.S. Appl. No. 17/676,618, dated Nov. 30, 2022, (13 pages), United States Patent and Trademark Office, US.

Final Office Action for U.S. Appl. No. 16/780,448, dated Sep. 15, 2022, (37 pages), United States Patent and Trademark Office, US.

Advisory Action (PTOL-303) for U.S. Appl. No. 17/676,618, dated Jul. 6, 2023, (3 pages), United States Patent and Trademark Office, US.

Final Office Action for U.S. Appl. No. 17/676,618, dated Mar. 24, 2023, (20 pages), United States Patent and Trademark Office, US.

NonFinal Office Action dated U.S. Appl. No. 16/780,448, dated Jun. 1, 2023, (12 pages), United States Patent and Trademark Office, US.

NonFinal Office Action for U.S. Appl. No. 17/676,618, dated Aug. 29, 2023, (11 pages), United States Patent and Trademark Office, US.

Final Rejection Mailed on Feb. 2, 2024 for U.S. Appl. No. 17/676,618, 12 page(s).

Notice of Allowance and Fees Due (PTOL-85) Mailed on Mar. 29, 2024 for U.S. Appl. No. 17/676,618, 18 page(s).

* cited by examiner

500

600

A        D        H        J        NULL 601        602        603        604        605

404

Determine Ontology Object for the Initial Raw Inputs
701

Determine a Selected Prediction Traversal Path for the Ontology Object
702

Determine the Partial Prediction Based on the Ontology Object and the
Selected Prediction Traversal Path
703

PREDICTIVE DATA ANALYSIS IN CONCEPTUALLY HIERARCHICAL DOMAINS

BACKGROUND

Many existing data analysis systems face efficiency and/or reliability drawbacks in generating predictive outputs that correspond to complexities of conceptually hierarchical domains. In part because of their complex semantic relationships and complex prediction patterns, conceptually hierarchical domains present significant challenges for existing predictive data analysis systems that are not configured to accommodate such complexities. Through ingenuity and innovation, the inventors have discovered techniques for efficient and reliable predictive data analysis in conceptually hierarchical domains.

BRIEF SUMMARY

In general, embodiments of the present invention provide methods, apparatus, systems, computing devices, computing entities, and/or the like for predictive data analysis in conceptually hierarchical domains. Certain embodiments utilize systems, methods, and computer program products that performing predictive data analysis in in conceptually hierarchical domains by using at least one of partial predictions and encoding hierarchies.

In accordance with one aspect, a method is provided. In one embodiment, the method comprises obtaining one or more initial raw inputs; determine a partial prediction for the one or more initial raw inputs, wherein: (i) the partial prediction is associated with an initial encoding hierarchy, and (ii) the initial encoding hierarchy is associated with a plurality of prediction nodes; determining, based on the partial prediction and the initial encoding hierarchy, one or more partial prediction information deficiencies for partial prediction; obtaining one or more supplemental raw inputs based on the one or more partial prediction information deficiencies; and generating a conceptually hierarchical prediction based on the one or more supplemental raw inputs and the partial prediction.

In accordance with another aspect, a computer program product is provided. The computer program product may comprise at least one computer-readable storage medium having computer-readable program code portions stored therein, the computer-readable program code portions comprising executable portions configured to obtain one or more initial raw inputs; determine a partial prediction for the one or more initial raw inputs, wherein: (i) the partial prediction is associated with an initial encoding hierarchy, and (ii) the initial encoding hierarchy is associated with a plurality of prediction nodes; determine, based on the partial prediction and the initial encoding hierarchy, one or more partial prediction information deficiencies for partial prediction; obtain one or more supplemental raw inputs based on the one or more partial prediction information deficiencies; and generate a conceptually hierarchical prediction based on the one or more supplemental raw inputs and the partial prediction.

In accordance with yet another aspect, an apparatus comprising at least one processor and at least one memory including computer program code is provided. In one embodiment, the at least one memory and the computer program code may be configured to, with the processor, cause the apparatus to obtain one or more initial raw inputs; determine a partial prediction for the one or more initial raw inputs, wherein: (i) the partial prediction is associated with an initial encoding hierarchy, and (ii) the initial encoding hierarchy is associated with a plurality of prediction nodes; determine, based on the partial prediction and the initial encoding hierarchy, one or more partial prediction information deficiencies for partial prediction; obtain one or more supplemental raw inputs based on the one or more partial prediction information deficiencies; and generate a conceptually hierarchical prediction based on the one or more supplemental raw inputs and the partial prediction.

BRIEF DESCRIPTION OF THE DRAWINGS

Figure 1:
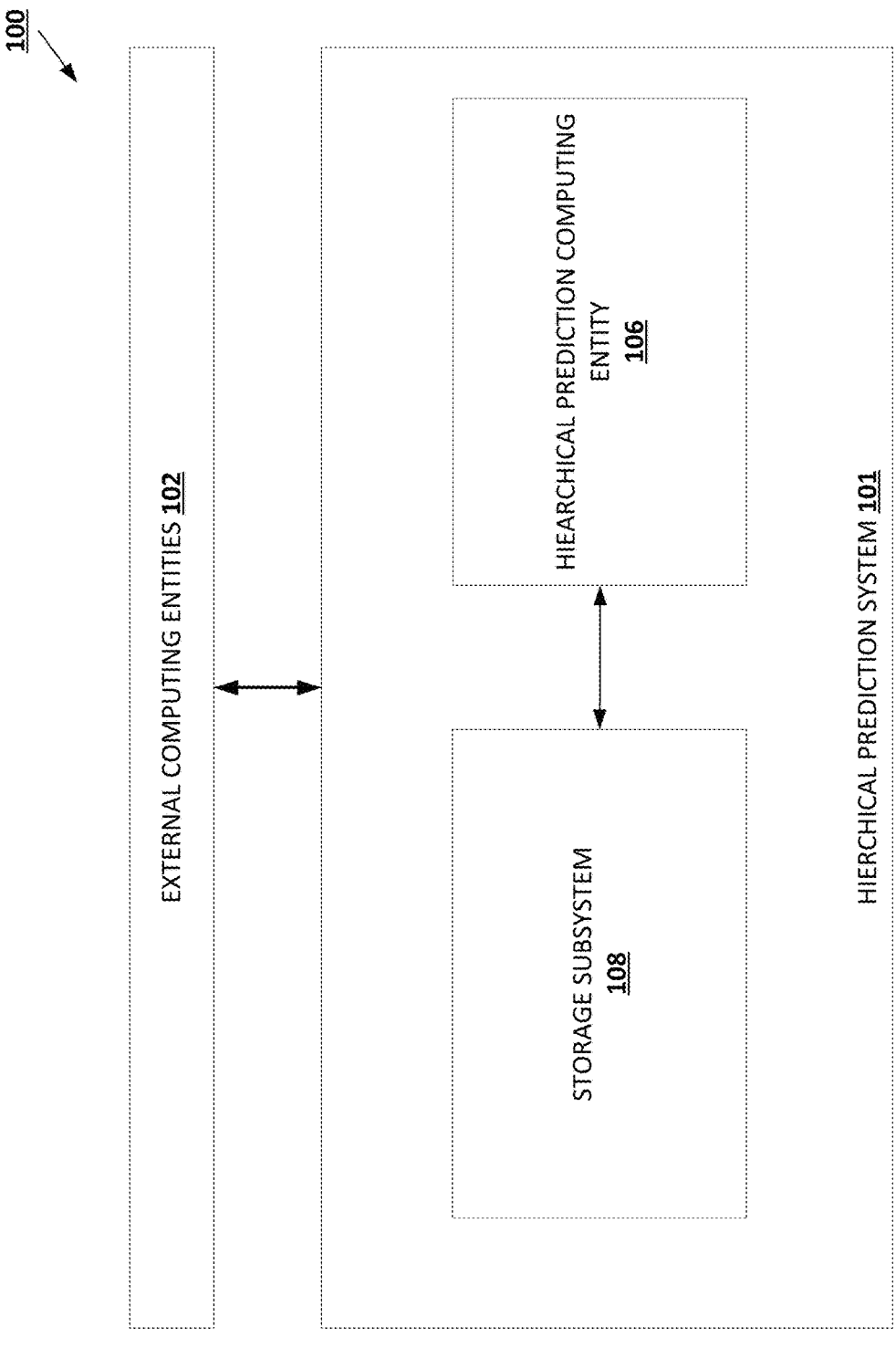

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
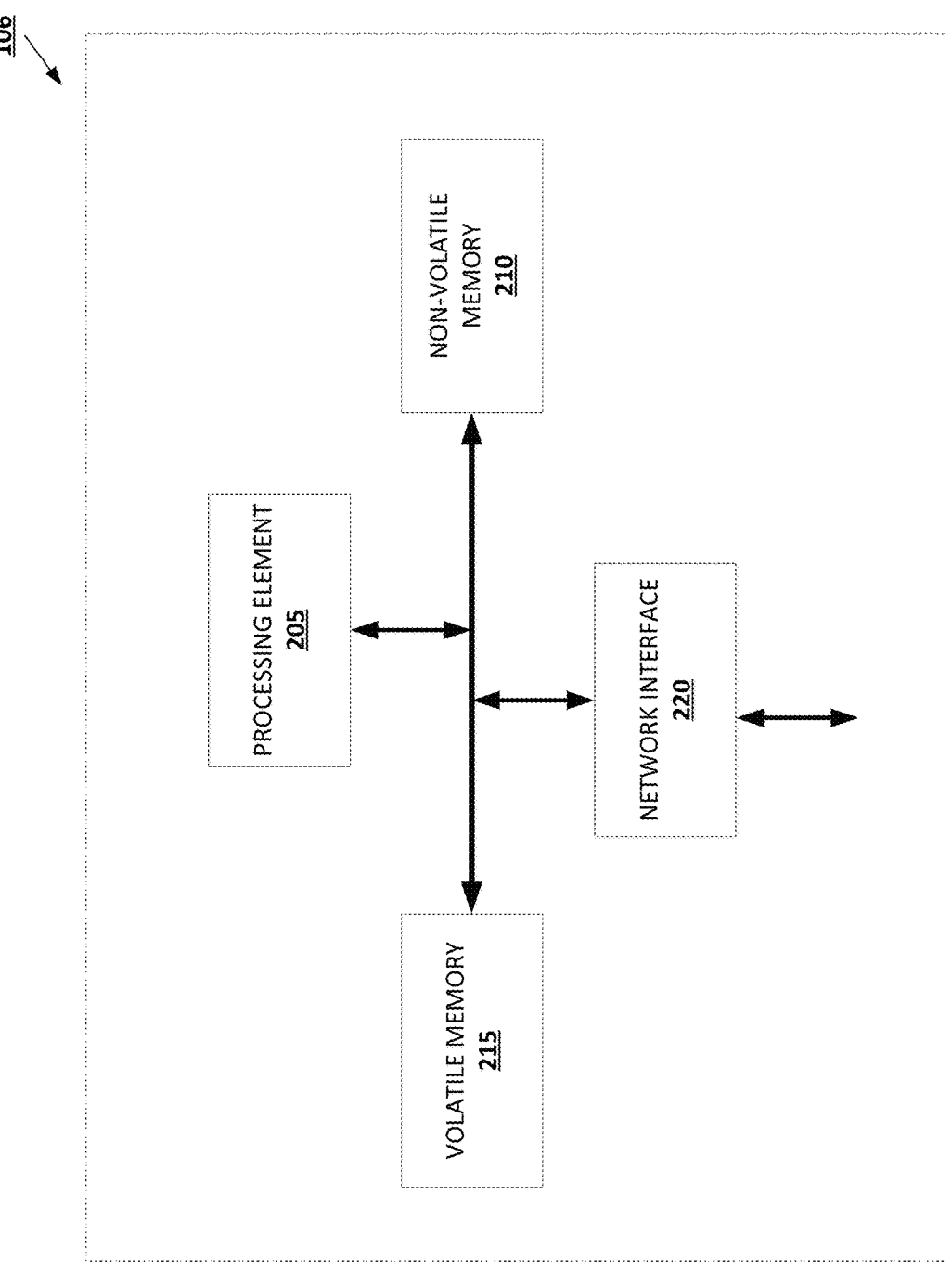

FIG. 2 provides an example hierarchical prediction computing entity in accordance with some embodiments discussed herein.

Figure 3:
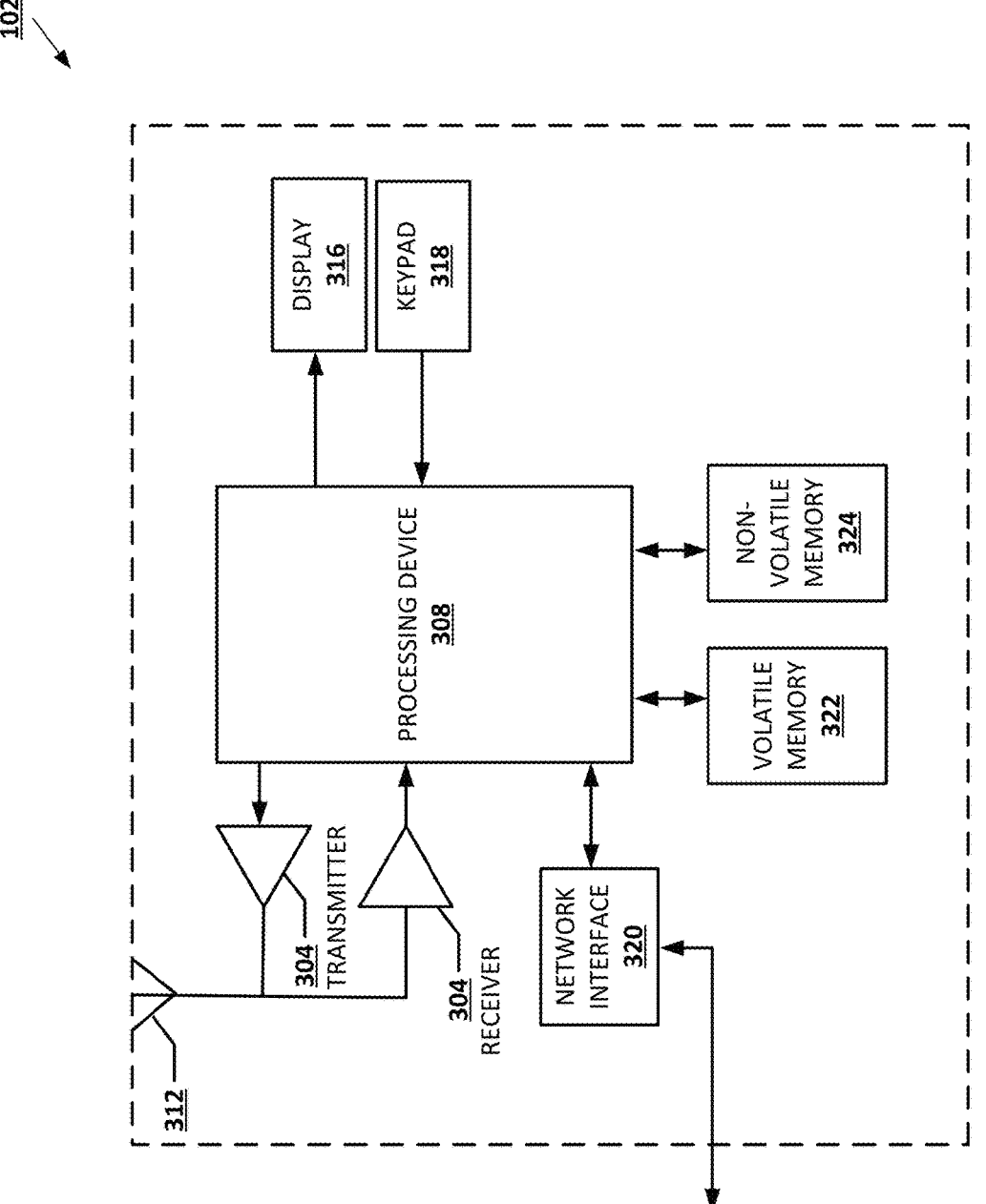

FIG. 3 provides an example external computing entity in accordance with some embodiments discussed herein.

Figure 4:
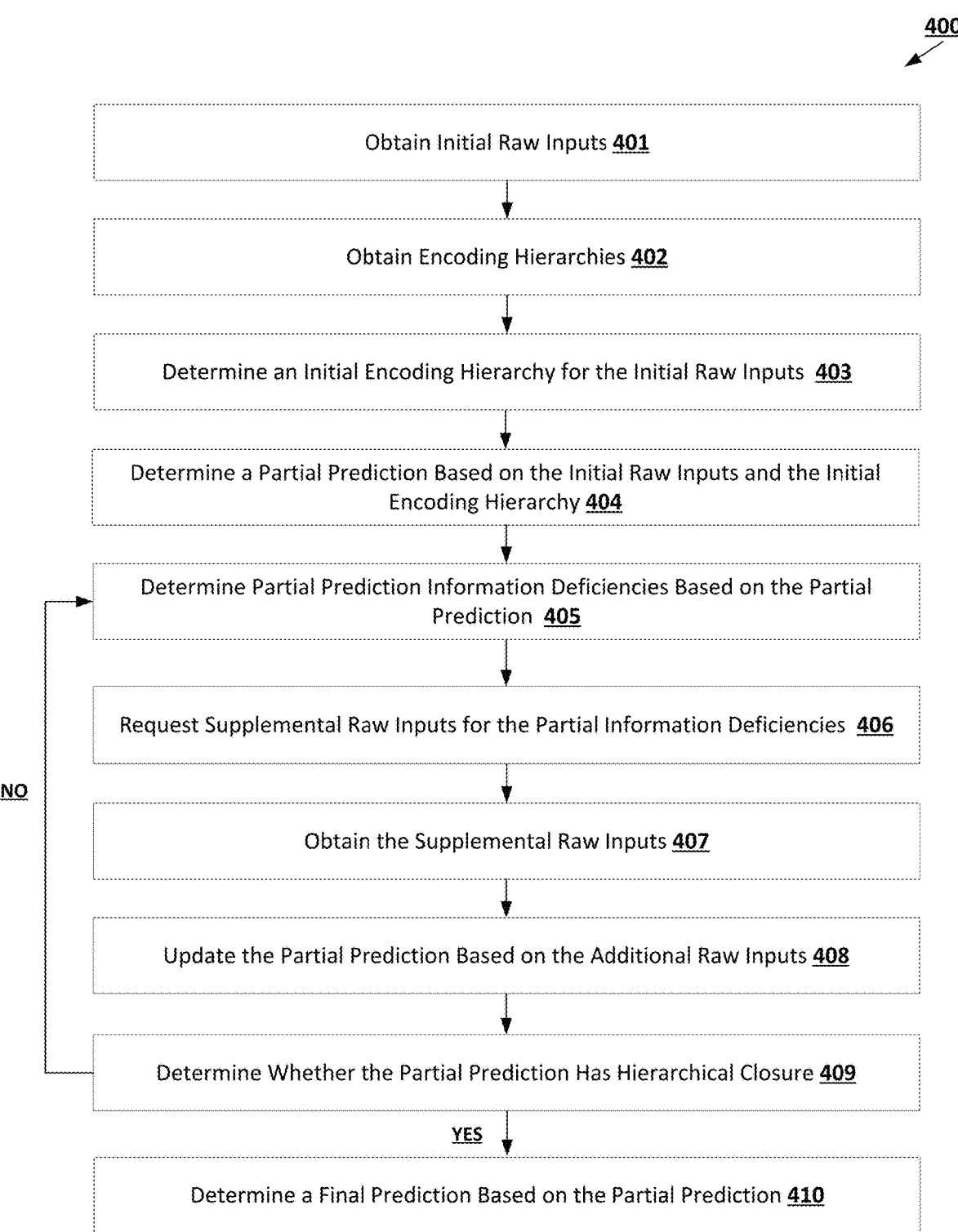

FIG. 4 is a flowchart diagram of an example process for performing a hierarchical prediction in accordance with some embodiments discussed herein.

Figure 5:
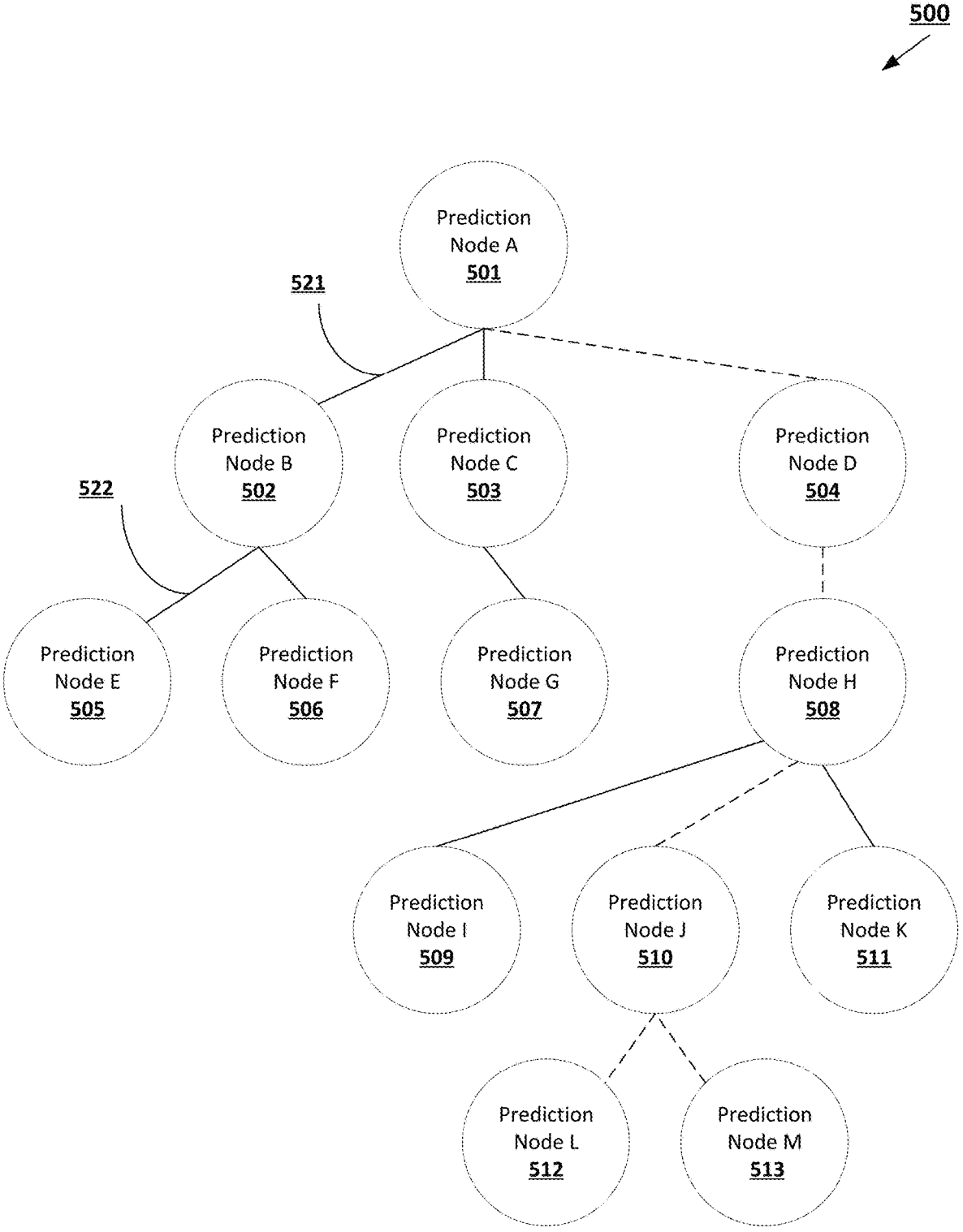

FIG. 5 provides an operational example of an encoding hierarchy in accordance with some embodiments discussed herein.

Figure 6:
Figure 6:
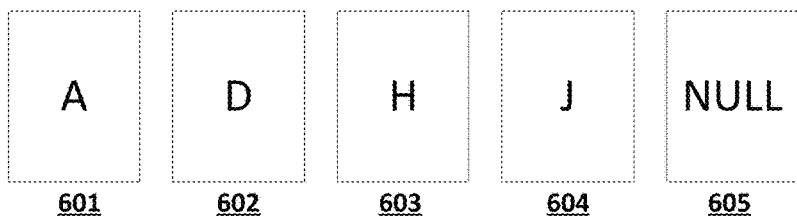

FIG. 6 provides an operational example of a partial prediction in accordance with some embodiments discussed herein.

Figure 7:
Figure 7:
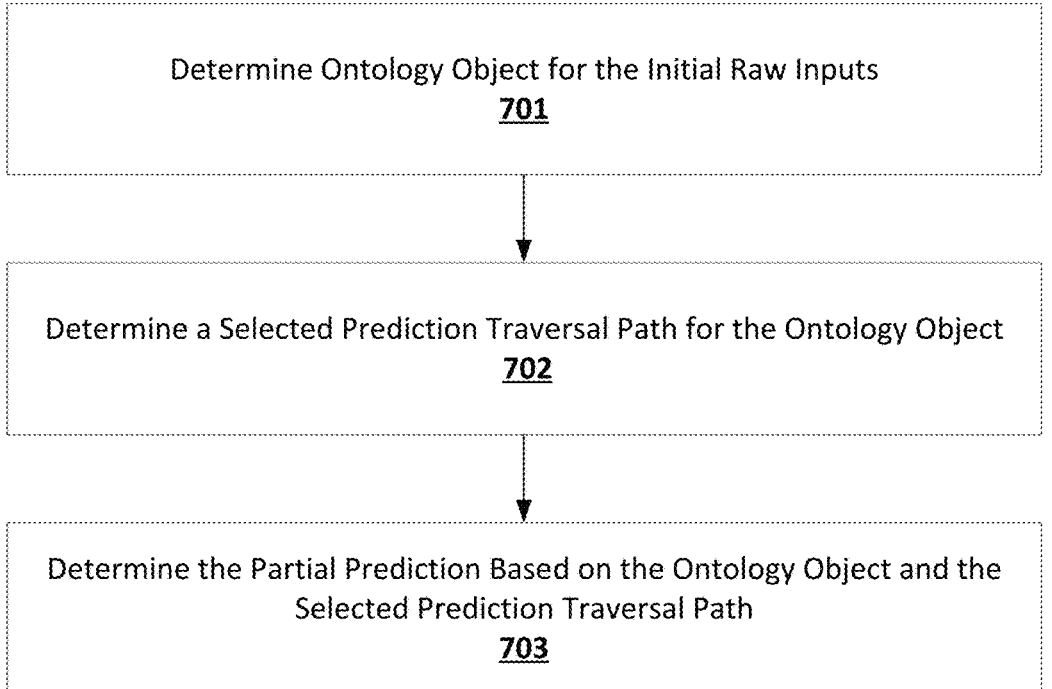

FIG. 7 is a flowchart diagram of an example process for determining a partial prediction in accordance with some embodiments discussed herein.

Figure 8:
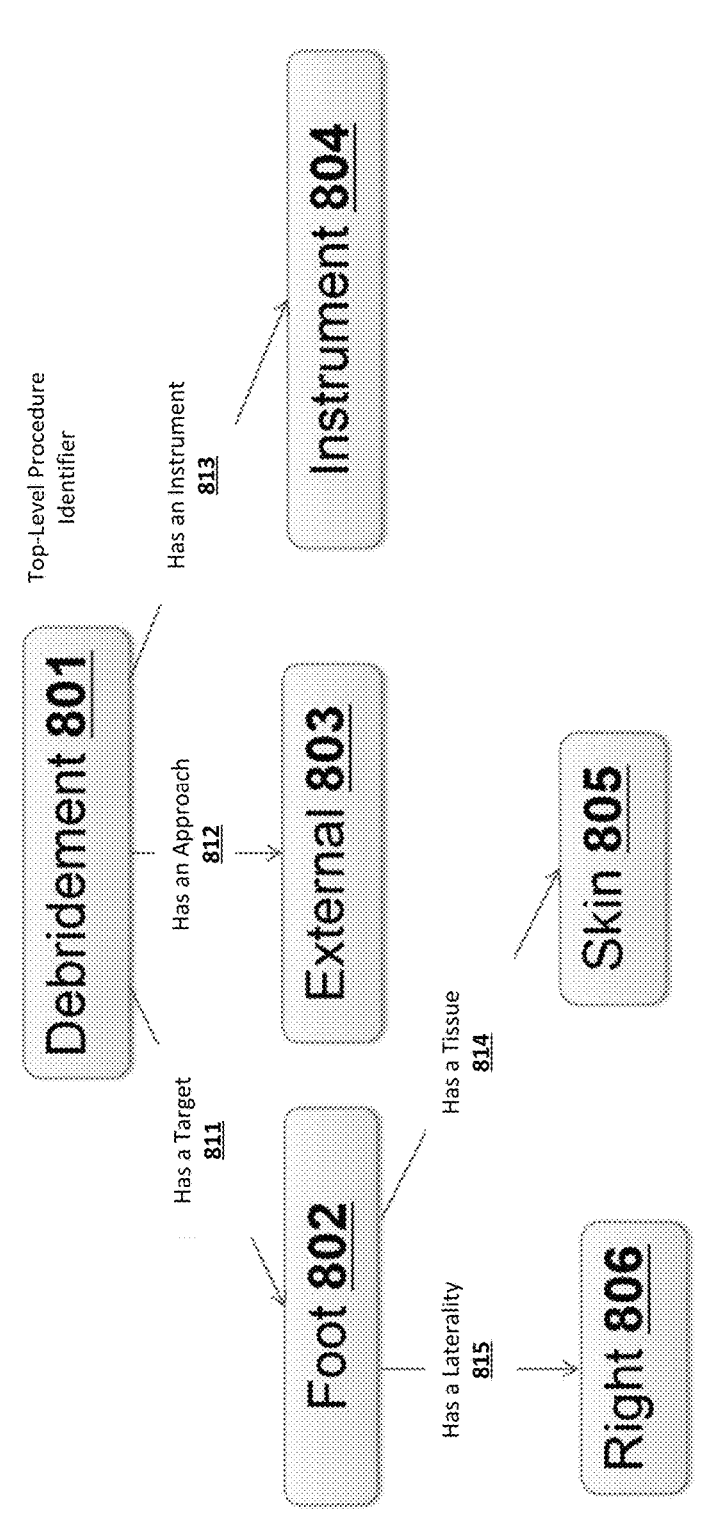

FIG. 8 provides an operational example of a medical procedure data model in accordance with some embodiments discussed herein.

Figure 9:
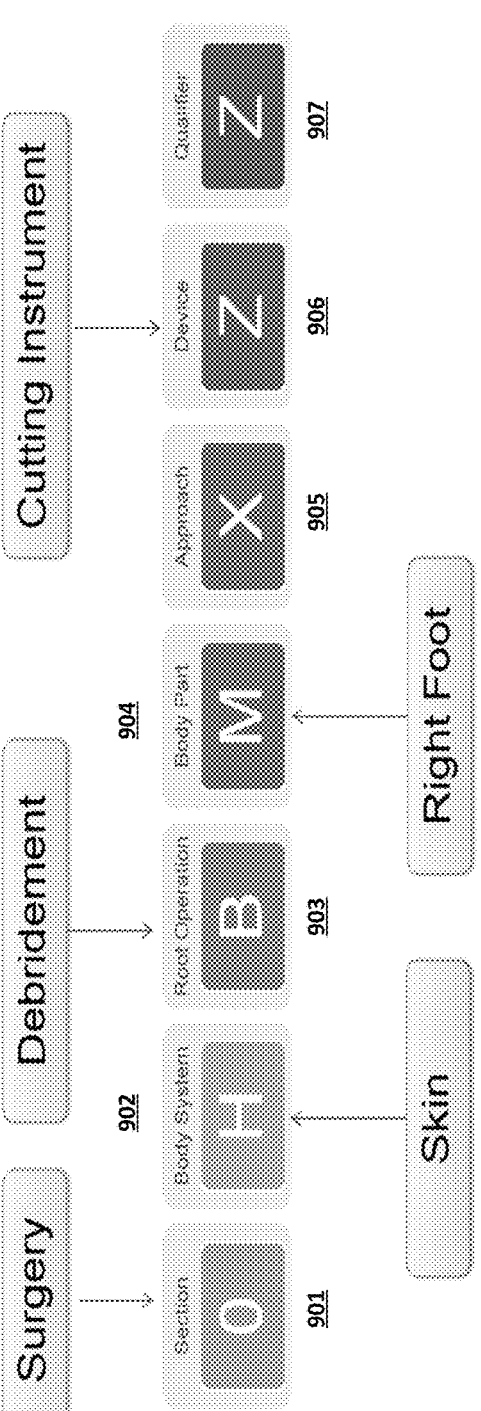

FIG. 9 provides an operational example of a medical procedure final prediction in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Discussed herein methods, apparatus, systems, computing devices, computing entities, and/or the like for predictive data analysis in conceptually hierarchical domains. As will be recognized, however, the disclosed concepts can be used to perform other types of data analysis and/or predictive data analysis in other domains, such as other complex domains.

A. Technical Problems

Conceptually hierarchical domains pose challenges for predictive data analysis because of their complex semantics. Many existing predictive data analysis systems are designed to account for complexity of inputs but are ill-suited to accommodate complexity of output data. For example, when an output space includes complex hierarchical relationships between various prediction targets, many existing predictive data analysis models fail to properly capture such complex hierarchical relationships unless they are supplied with enormous training data and provided with long training times. Thus, many existing predictive data analysis systems fail to effectively and efficiently generate predictions for prediction tasks that deal with complex output spaces, such as prediction tasks that deal with conceptually hierarchical domains.

An example of a prediction task in a conceptually hierarchical domain is medical code detection based on underlying medical data (e.g., based on medical notes data). For example, many medical entities need to detect medical codes corresponding to the 10th Revision of the International Classification of Diseases Procedure Classification System (ICD-10-PCS) based on medical data. The ICD-10-PCS is highly hierarchical in a manner that undermines automatic ICD-10-PCS code detection as well as automatic detection of information deficiencies in provider data. This is despite frequent shortcomings by medical providers in providing sufficient data corresponding to ICD-10-PCS fields. For example, a clinician could document that "a thoracentesis was performed percutaneously" without specifying whether the thoracentesis was performed on the left or right pleural cavity, but existing predictive data analysis problems will face challenges in detecting the deficiency in the referenced medical data. Clinicians receiving queries long after medical encounters lead to inaccurate information.

Thus, there is a technical need both for predictive data analytics systems adapted to complex hierarchical domains as well as predictive data analytics systems configured to detect information deficiencies in provider data (e.g., medical provider data) efficiently and effectively. Given the current state of the art, many existing predictive data analytics systems are incapable of efficient and effective detection of information deficiencies in medical data. Moreover, many existing predictive data analytics systems are ill-suited to detect features related to medical codes, such as ICD-10-PCS codes, in the medical data. As a result, substantial medical information is lost and/or transmitted inefficiently between providers and other interested organizations, such as healthcare provider instructions and/or health insurance provider institutions. Given that accurate and comprehensive documentation of medical information is important to ensuring improved patient outcomes, improved data quality, and improved accurate reimbursement, the above-noted failures of existing predictive data analytics solutions cause substantial inefficiencies for computer systems designed for medical claim processing.

B. Technical Solutions

Various embodiments of the present invention address technical challenges related to efficiency of predictive data analysis for conceptually hierarchical domains by enabling a predictive data analytics system that allows partial prediction generation using underlying encoding hierarchies. The encoding hierarchies can capture complex relationships in the output space of conceptually hierarchical domains, while partial predictions can enable real-time detection of information deficiencies as well as real-time solicitation of supplemental raw inputs. Through utilizing partial prediction generation using underlying encoding hierarchies, various embodiments of the present invention provide predictive data analytics solutions that can efficiently and effectively generate predictions corresponding to highly complex output spaces, such as the ICD-10-PCS output space. Importantly, because various embodiments of the present invention are configured to generate predictions in accordance with complex encoding hierarchies, they will take such complexities into account during any training and reduce system efficiencies associated with model training.

Various disclosed predictive data analysis systems use real-time natural language processing to detect missing information needed to produce fully billable ICD-10-PCS codes. Upon detecting missing information, the disclosed predictive data analysis systems enable generating voice synthesis prompts to medical providers for supplemental information. For example, if an ICD-10-PCS code requires that the laterality of the heart be specified, a disclosed the system may make a voice synthesis prompt asking "Is it left or right heart?" Once prompted, the provider can interactively elaborate with procedure details. For example, the provider could respond with simply stating "left heart." The system will then analyze and inform the provider of the validity of the response. This will reduce information clarification overheads by ensuring necessary data is collected before medical encounters are sent to billing coding specialists to determine proper billing codes.

Moreover, various embodiments of the present invention disclose medical voice modules integrated with the current procedure coding engines. As an encounter is documented (e.g., via the integrated medical voice module or a typing terminal), the received documentation is transmitted to a core natural language processing engine. During this stage, all of the relevant medical concepts are extracted and used to create full or partial ICD-10-PCS codes. Voice synthesis may then be used to prompt the clinician to provide information that is necessary to complete the partial codes. The clinician's response is then added to the documentation and validated by the core natural language processing engine. In some embodiments, the core natural language processing engine utilizes semantic objects mapped to medical documentation data. When a partial code is produced, the core natural language processing engine may access ontological specifications of the underspecified slot. Based on the ontological slot restrictions of the partial slot, the core natural language processing engine can determine the most appropriate ways to generate prompts for missing information.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 provides an exemplary overview of an architecture 100 that can be used to practice embodiments of the present invention. The architecture 100 includes one or more external computing entities 102 and a hierarchical prediction system 101. The hierarchical prediction system 101 may be configured to receive raw inputs from the external computing entities 102, generate predictions based on the raw inputs, and provide the generated predictions to the external computing entities 102. The one or more external computing entities and the hierarchical prediction system 101 may be connected through a communication network (not shown). The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The architecture 100 includes one or more external computing entities 102 and a hierarchical prediction system 101. The hierarchical prediction system 101 may be configured to receive raw inputs from the external computing entities 102, generate predictions based on the raw inputs, and provide the generated predictions to the external computing entities 102. The one or more external computing entities and the hierarchical prediction system 101 may be connected through a communication network (not shown).

For example, a particular external computing entity 102 may be a medical provider computing entity that supplies medical data (e.g., medical notes data) associated with a medical procedure (e.g., a surgery, a visitation, etc.) to the hierarchical prediction system 101. The hierarchical prediction system 101 may be configured to automatically generate a medical code for the medical procedure based on the medical data received from the external computing entity 102 and provide the generated medical code to the external computing entity 102. In addition, the hierarchical prediction system 101 may detect information deficiencies in the medical data that undermines medical code generation, and request supplemental information from the external computing entity in relation to the detected information deficiencies.

The hierarchical prediction system 101 includes a storage subsystem 108 and a hierarchical prediction computing entity 106. The storage subsystem 108 may be configured to store prediction parameters used by the hierarchical prediction computing entity 106 to generate predictions. For example, the storage subsystem 108 may store encoding hierarchies associated with prediction output domains. The storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The hierarchical prediction computing entity 106 may be configured to generate predictions based on raw inputs (e.g., text inputs, voice inputs, etc.) received from the external computing entities 102 and based on encoding hierarchies stored in the storage subsystem 108. Furthermore, the hierarchical prediction computing entity 106 may be configured to detect information deficiencies in initial raw inputs and request supplemental raw inputs from the external computing entities 102. Moreover, the hierarchical prediction computing entity 106 may be configured to transmit predictions (e.g., partial predictions and/or final predictions) as well as information deficiency requests to the external computing entities 102.

A. Exemplary Hierarchical Prediction Computing Entity

FIG. 2 provides a schematic of a hierarchical prediction computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the hierarchical prediction computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the hierarchical prediction computing entity 106 may include or be in communication with one or more processing elements 205 (also referred to as processors, processing circuitry, and/or similar terms used herein interchangeably) that communicate with other elements within the hierarchical prediction computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the hierarchical prediction computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the hierarchical prediction computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the hierarchical prediction computing entity 106 with the assistance of the processing element 205 and operating system.

As indicated, in one embodiment, the hierarchical prediction computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the hierarchical prediction computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the hierarchical prediction computing entity 106 may include or be in communication with one or more input elements, such as a keyboard input, a mouse input, a touch screen/display input, motion input, movement input, audio input, pointing device input, joystick input, keypad input, and/or the like. The hierarchical prediction computing entity 106 may also include or be in communication with one or more output elements (not shown), such as audio output, video output, screen/display output, motion output, movement output, and/or the like.

B. Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the hierarchical prediction computing entity 106. In a particular embodiment, the external computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the hierarchical prediction computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MIMS), Dual- Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the user computing entity's 121 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the hierarchical prediction computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the hierarchical prediction computing entity 106 and/or various other computing entities.

In another embodiment, the external computing entity 102 may include one or more components or functionality that are the same or similar to those of the hierarchical prediction computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. Exemplary System Operation

The operation of various embodiments of the present invention will now be described. As discussed herein, various embodiments are directed to systems and methods for predictive data analysis in conceptually hierarchical domains. Various embodiments of the present invention address technical challenges related to efficiency of predictive data analysis for conceptually hierarchical domains by enabling a predictive data analytics system that allows partial prediction generation using underlying encoding hierarchies. The encoding hierarchies can capture complex relationships in the output space of conceptually hierarchical domains, while partial predictions can enable real-time detection of information deficiencies as well as real-time solicitation of supplemental raw inputs. Through utilizing partial prediction generation using underlying encoding hierarchies, various embodiments of the present invention provide predictive data analytics solutions that can efficiently and effectively generate predictions corresponding to highly complex output spaces, such as the ICD-10-PCS output space. Importantly, because various embodiments of the present invention are configured to generate predictions in accordance with complex encoding hierarchies, they will take such complexities into account during any training and reduce system efficiencies associated with model training.

FIG. 4 is a flowchart diagram of an example process 400 for performing a hierarchical prediction. Via the various steps/operations of process 400, a computer system (e.g., the hierarchical prediction system 101 of FIG. 1) can perform predictive data analysis in a conceptually hierarchical domain. Process 400 will now be described with reference to the hierarchical prediction system 101 of FIG. 1, although a person of ordinary skill in the art will recognize that the process 400 may be performed by any system of one or more computers.

Process 400 begins at step/operation 401 when the hierarchical prediction computing entity 106 obtains one or more initial raw inputs. In some embodiments, at least some of the one or more initial raw inputs are retrieved from the storage subsystem 108. In some embodiments, at least some of the one or more initial raw inputs are retrieved from one or more external computing entities 102. In some embodiments, the one or more initial raw inputs include one or more natural language inputs (e.g., voice-based natural language inputs and/or text-based natural language inputs). In some embodiments, the one or more initial raw inputs include one or more medical provider inputs. In some embodiments, the one or more initial raw inputs relate to a common prediction task (e.g., an ICD-10-PCS code prediction).

Examples of initial raw inputs may include medical notes data and medical claims data. The medical notes may be textual medical notes (e.g., typed or otherwise input to a visual input interface of a computing entity). In certain embodiments, the medical notes may be embodied as, or may comprise voice-based notes, such as dictated notes of a medical service provider to an audio-based input interface of a computing entity. In some embodiments, the one or more initial raw inputs include voice data, such as voice data associated with one or more voice inputs by a medical provider. In some embodiments, the one or more initial raw inputs include at least some compressed data, such as voice data compressed using an MP3 compression standard. In some embodiments, the one or more initial raw inputs include at least some unstructured data, such as unstructured text data and/or unstructured voice data. In some embodiments, the one or more inputs include at least some semi-structured and/or structured data, such as JavaScript Object Notation (JSON) data, Structured Query Language (SQL) data, etc.

At step/operation 402, the hierarchical prediction computing entity 106 obtains one or more encoding hierarchies. An encoding hierarchy may be a data structure that defines a predictive hierarchical relationship between two or more prediction nodes that collectively characterize a prediction. In some embodiments, a predictive hierarchical relationship between two or more prediction nodes is a relationship between the two prediction nodes based on which: (i) a determination of a positive prediction value for any prediction node necessitates a determination of a positive prediction value for at least one prediction node that is deemed to be hierarchically dependent on the first prediction node; and/or (ii) a determination of a negative prediction value for a first prediction node necessitates determination of a negative prediction value for any second prediction node that is deemed to be hierarchically dependent on the first prediction node. In some embodiments, a predictive space having at least one predictive hierarchical relationship is a conceptually hierarchical prediction space. In some embodiments, a prediction based on and/or in relation to a conceptually hierarchical prediction space is a conceptually hierarchical prediction.

In some embodiments, a positive prediction value is any prediction value that indicates a predicted applicability of a prediction node with respect to one or more raw inputs, such as a discrete or continuous value for a prediction node based on the one or more raw inputs. In some embodiments, a negative prediction value is any prediction value that indicates a predicted inapplicability of a prediction node with respect to one or more raw inputs, such as a value indicating that lack of inference of a discrete or continuous value for a prediction node based on the one or more raw inputs. For example, a positive prediction value for a prediction node relating to right-laterality of an arm surgery may indicate that a corresponding arm surgery relates to the right arm. As another example, a negative prediction value for a prediction node relating to right-laterality of an arm surgery may indicate that a corresponding arm surgery does not relate to the right arm. As yet another example, a positive prediction value for a prediction node relating to a type of instrument used in a surgery may indicate an instrument identifier for a particular instrument. As a further example, a negative prediction value for a prediction node relating to a type of instrument used in a surgery may indicate that no instrument was used in the surgery.

In some embodiments, prediction nodes P1 and P2 may be deemed to have a predictive hierarchical relationship if determination of a positive prediction value for P1 necessitates determination of a positive prediction value for P2 (i.e., if both P1 and P2 have to be collectively inferred from a set of raw inputs). In some embodiments, prediction nodes P3 and P4 may be deemed to have a predictive hierarchical relationship if determination of a negative prediction value for P3 necessitates a determination of a negative prediction value for P4 (i.e., if P4 cannot be inferred without a positive inference of P3). In some embodiments, prediction nodes P5-P7 may be deemed to have a predictive hierarchical relationship if determination of a positive prediction value for P5 necessitates a determination of a positive prediction value for either P6 or P7. In some embodiments, prediction nodes P8-P10 may be deemed to have a predictive hierarchical relationship if a determination of a positive prediction value for P5 necessitates a determination of a positive prediction value for both P9 and P10.

In some embodiments, a predictive hierarchical relationship includes one or more predictive dependence relationships. A predictive dependence relationship may be a relationship between two prediction nodes that indicates that a first prediction node of the two prediction nodes is deemed to be hierarchically dependent on a second prediction node of the two prediction nodes. In such a predictive dependence relationship, the first prediction node may be deemed an "inferior" prediction node and the second prediction node may be deemed a "superior" prediction node. Because an inferior prediction node in a particular predictive dependence relationship may be a superior prediction node in a second predictive dependence relationship and a superior prediction node in the particular predictive dependence relationship may be an inferior prediction node in a third predictive dependence relationship, the inferiority and superiority relationships may be hierarchically recursive such that: (i) each first prediction node is superior to any second prediction node that is inferior to at least one third prediction node that is inferior to the first prediction node, and/or (ii) each first prediction node is inferior to any second prediction node that is superior to at least one third prediction node that is superior to the first prediction node.

FIG. 5 provides an operational example of an encoding hierarchy 500. The depicted encoding hierarchy 500 includes thirteen prediction nodes (i.e., prediction nodes A-M 501-513). In the depicted encoding hierarchy 500, each hierarchical dependency link between two prediction nodes (e.g., hierarchical dependency link 521 between prediction node A 501 as well as prediction node B 502 and hierarchical dependency link 522 between prediction node B 502 and prediction node E 505) indicates a predictive dependence relationship between the upper prediction node connected to the hierarchical dependency link (e.g., prediction node A 501 for the hierarchical dependency link 521 and prediction node B 502 for the hierarchical dependency link 522) and the lower prediction node connected to the hierarchical dependency link (e.g., prediction node B 502 for the hierarchical dependency link 521 and prediction node E 505 for the hierarchical dependency link 522).

In some embodiments, prediction nodes correspond to real-world and/or conceptual entities and/or properties. Moreover, in some embodiments, a predictive dependence relationship may have one or more predictive semantics, where a predictive semantic for a particular predictive dependence relationships may define at least one of the following: (i) whether a positive and/or negative value of a superior prediction node in the particular predictive relationship necessitates a positive and/or negative value for an inferior node in the predictive relationship; and (ii) whether a positive and/or negative value for at least one other node that is an inferior node in another predictive dependence relationship with the superior prediction node in the particular predictive relationship necessitates a positive and/or negative value for an inferior node in the predictive relationship. For example, based on a necessity predictive semantic, a positive prediction value for a superior prediction node in a predictive dependence relationship necessitates a positive prediction value for an inferior prediction node in the predictive dependence relationship. As another example, based on a disjunctive predictive semantic, a positive prediction value for a superior prediction node having a predictive dependence relationship with a particular inferior prediction node in the predictive dependence relationship necessitates a positive prediction value for the particular inferior prediction node only if no other inferior prediction node associated with the superior prediction node has a corresponding positive value (i.e., a positive prediction value for a superior prediction node necessitates a positive prediction value for only one of one or more inferior prediction nodes associated with the superior prediction node).

Thus, in the depicted encoding hierarchy 500 of FIG. 5, if the predictive dependence relationship corresponding to the hierarchical dependency link 521 has a necessity predictive semantic and the predictive dependence relationship corresponding to the hierarchical dependency link 522 has a disjunctive predictive semantic, then determination of a positive value for the prediction node 501 necessitates determination of a positive value for the prediction node 502, which in turn necessitates determination of a positive value for either prediction node E 505 or prediction node F 506. This may, for example, be the case if prediction node A 501 corresponds to whether a prediction relates to a person, the prediction node B 502 corresponds to whether the predicted person is left-handed or right handed, the prediction node E 505 corresponds to whether the predicted person is left-handed, and the prediction node F 506 corresponds to whether the predicted person is right-handed. As another example, the mentioned semantic designations may correspond to a predictive hierarchical relationship in which prediction node A 501 corresponds to whether a prediction relates to an eye surgery medical procedure, the prediction node B 502 corresponds to whether the predicted eye surgery procedure relates to the left eye or the right eye, the prediction node E 505 corresponds to whether the predicted eye surgery procedure relates to the left eye, and the prediction node F 506 corresponds to whether the predicted eye surgery procedure relates to the right eye.

At step/operation 403, the hierarchical prediction computing entity 106 determines an initial encoding hierarchy (e.g., an initial graph) for the one or more initial raw inputs. In some embodiments, the hierarchical prediction computing entity 106 processes (e.g., using one or more natural language processing procedures) the one or more initial raw inputs to select an initial encoding hierarchy of the encoding hierarchies obtained in step/operation 402 for the one or more initial raw inputs. For example, the encoding hierarchies obtained in step/operation 402 may relate to a variety of medical procedures, and the hierarchical prediction computing entity 106 may determine that the one or more initial raw inputs relate to an eye examination procedure.

In some embodiments, to determine the initial encoding hierarchy for the one or more initial raw inputs, the hierarchical prediction computing entity 106 processes the one or more initial natural language inputs to determine a hierarchy prediction score for each encoding hierarchy obtained in step/operation 402. The hierarchical prediction computing entity 106 may then select the encoding hierarchy having the highest hierarchy prediction score as the initial encoding hierarchy for the one or more initial raw inputs. In some embodiments, to determine a hierarchy prediction score for a particular encoding hierarchy, the hierarchical prediction computing entity 106 may perform natural language processing to extract features of the one or more initial raw inputs. The hierarchical prediction computing entity 106 may then determine the hierarchy prediction score for the particular encoding hierarchy based on a correspondence of the extracted features of the one or more initial raw inputs and the prediction nodes of the one or more initial raw inputs.

In some embodiments, to determine a hierarchy prediction score for a particular encoding hierarchy, the hierarchical prediction computing entity 106 processes the one or more initial raw inputs (e.g., using a natural language processing engine) to determine one or more inferred prediction values associated with the one or more initial raw inputs. Then, the hierarchical prediction computing entity 106 determines, for each inferred prediction value of the one or more inferred prediction value, a value prediction score that determines a degree of confidence in the inferred prediction value. Afterward, the hierarchical prediction computing entity 106 determines a hierarchy prediction score for each encoding hierarchy obtained in step/operation 402 by combining (e.g., computing a statistical distribution measure, such as a mean, weighted mean, or median, of) the value prediction scores for any inferred prediction values that correspond to a prediction node of the encoding hierarchy.

In some embodiments, the hierarchical prediction computing entity 106 selects an encoding hierarchy having the highest hierarchy prediction score as the initial encoding hierarchy. In some embodiments, the hierarchical prediction computing entity 106 selects two or more encoding hierarchies (e.g., n encoding hierarchies having highest hierarchy prediction scores and/or two or more encoding hierarchies whose corresponding hierarchy prediction scores exceed a hierarchy prediction score threshold), provides a hierarchy selection prompt indicating the selected two or more encoding hierarchies to a particular user profile (e.g., a particular medical provider user profile) through transmission of the hierarchy selection prompt to an external computing entity 102 utilized by the particular user profile, obtains a hierarchy selection input generated based on user engagement with the external computing entity 102 by the particular user profile, and determines the initial encoding hierarchy based on the hierarchy selection input.

At step/operation 404, the hierarchical prediction computing entity 106 determines a partial prediction based on the initial raw inputs and the initial encoding hierarchy. A partial prediction is a data object that: (i) identifies a prediction traversal path within the initial encoding hierarchy for the one or more raw inputs, and (ii) includes positive predictive values for at least one prediction node associated with the prediction traversal path. A prediction traversal path may be a combination of one or more predictive dependence relationships that collectively connect the most superior prediction node in an encoding hierarchy (e.g., a root node in a graph corresponding to the encoding hierarchy, such as prediction node A 501 in the encoding hierarchy 500 of FIG. 5) and at least one most inferior prediction node in the encoding hierarchy (e.g., at least one branch node in a graph corresponding to the encoding hierarchy, such as prediction node E 505 in the encoding hierarchy 500 of FIG. 5).

FIG. 6 provides an operational example of a partial prediction 600. The partial prediction includes prediction values 601-605, where each prediction value 601-605 corresponds to a prediction node associated with a particular prediction traversal path in the encoding hierarchy 500 of FIG. 5, and further where the particular prediction traversal path is associated with the dotted lines in the encoding hierarchy 500. Accordingly, in the partial prediction 600, prediction value 601 corresponds to prediction node A 501, prediction value B 602 corresponds to prediction node D 504, prediction value 603 corresponds to prediction node H 508, and prediction value 604 corresponds to prediction node J 510. The prediction value 605 may correspond to either prediction node L 512 or prediction node M 512, but it has a null value to indicate a negative prediction value.

In some embodiments, step/operation 404 may be performed in accordance with the steps/operations depicted in the flowchart diagram of FIG. 7. The process depicted in FIG. 7 begins at step/operation 701 when the hierarchical prediction computing entity 106 determines an ontology data object for the one or more initial raw inputs. In some embodiments, to determine the ontology data object, the hierarchical prediction computing entity 106 processes (e.g., using one or more natural language processing procedures) the one or more initial raw inputs to determine reliable prediction values for as many of the prediction nodes associated with the initial encoding hierarchy as possible. For example, the hierarchical prediction computing entity 106 may determine one or more prediction values for at least some of the prediction nodes associated with the initial encoding hierarchy, determine a prediction score for each prediction value of the one or more prediction values, and identify any prediction values whose prediction score exceeds a threshold prediction score as reliable prediction values. In some embodiments, the hierarchical prediction computing entity 106 may determine an ontology data object based on the reliable prediction values and use the ontology data object to determine a partial prediction.

In some embodiments, a reliable prediction value is a prediction value whose respective value prediction score exceeds a value prediction score threshold and/or whose respective value prediction score is among the highest n value prediction scores of the prediction scores for a group of prediction values. In some embodiments, to determine the ontology data object for particular raw inputs, the hierarchical prediction computing entity 106 processes the one or more initial raw inputs (e.g., using a natural language processing engine) to determine one or more inferred prediction values associated with the one or more initial raw inputs. Then, the hierarchical prediction computing entity 106 determines, for each inferred prediction value of the one or more inferred prediction value, a value prediction score that determines a degree of confidence in the inferred prediction value. Next, the hierarchical prediction computing entity 106 determines one or more reliable prediction values from the inferred prediction values. Afterward, the hierarchical prediction computing entity determines the ontology data object for the raw inputs based on the one or more reliable prediction values.

At step/operation 702, the hierarchical prediction computing entity 106 determines a selected prediction traversal path within the initial encoding hierarchy that best corresponds to the ontology data object. In some embodiments, to determine the selected prediction traversal path, the hierarchical prediction computing entity 106 first identifies one or more prediction traversal paths associated with the initial encoding hierarchy and identifies the prediction nodes associated with each prediction traversal path of the one or more prediction traversal paths. For example, the hierarchical prediction computing entity 106 may identify that the prediction traversal path indicated by dotted lines in the encoding hierarchy 500 of FIG. 5 is associated with prediction node A 501, prediction node D 405, prediction node H 508, prediction node J 510, prediction node L 512, and prediction node M 513.

In some embodiments, after identifying the prediction traversal paths associated with the initial encoding hierarchy and the prediction nodes associated with each prediction traversal path, the hierarchical prediction computing entity 106 determines a path prediction score for each prediction traversal path and selects the prediction traversal path having the highest path prediction score as the selected prediction traversal path for the ontology data object. In some embodiments, to determine the path prediction score for a prediction traversal path, the hierarchical prediction computing entity 106 determines a ratio of a count of prediction nodes of the prediction traversal path that have corresponding reliable predictive values in the ontology data object to a count of all prediction nodes of the prediction traversal path. In some embodiments, a reliable prediction value is a prediction value whose respective value prediction score exceeds a value prediction score threshold and/or whose respective value prediction score is among the highest n value prediction scores of the prediction scores for a group of prediction values At step/operation 703, the hierarchical prediction computing entity 106 determines the partial prediction based on the ontology object and the selected prediction traversal path. In some embodiments, the hierarchical prediction computing entity 106 identifies one or more selected prediction values from the reliable prediction values associated with the ontology object, where a selected prediction value is a reliable prediction value associated with a prediction node for the selected prediction traversal path. In some embodiments, the hierarchical prediction computing entity 106 determines the partial prediction based on the selected reliable prediction values.

In some embodiments, the partial prediction includes a negative and/or null prediction value corresponding to at least some (e.g., at least the most superior) prediction nodes associated with the selected prediction traversal path that do not have a corresponding reliable prediction value in the ontology object. In some embodiments, the partial prediction is associated with a partial prediction value order of the partial prediction values associated with the partial prediction. In some of those embodiments, the hierarchical prediction computing entity 106 determines the partial prediction value order based on the one or more predictive dependence relationships associated with the selected prediction traversal path (e.g., by putting the root node of the selected prediction traversal path first or last in the partial prediction, by ordering the prediction value based a hierarchical dependence of the corresponding prediction nodes in the selected prediction traversal path, etc.).

Returning to FIG. 4, at step/operation 405, the hierarchical prediction computing entity 106 determines partial prediction information deficiencies associated with the partial prediction based on the partial prediction and the initial encoding hierarchy. In some embodiments, the hierarchical prediction computing entity 106 determines partial prediction information deficiencies for each negative prediction value associated with the partial prediction (e.g., for prediction value 605 in the partial prediction 600 of FIG. 6). In some embodiments, the hierarchical prediction computing entity 106 identifies a prediction traversal path characterizing the partial prediction (e.g., the selected prediction traversal path determined in step/operation 702 of FIG. 7) and determines partial prediction information deficiencies based on prediction nodes associated with the prediction traversal path that do not have a positive prediction value in the partial prediction. For example, if there are no positive prediction values for a prediction node corresponding to a left arm and a prediction node corresponding to a right arm, the hierarchical prediction computing entity 106 may determine a partial prediction information deficiency related to arm laterality.

At step/operation 406, the hierarchical prediction computing entity 106 requests (e.g., from an external computing entity 102) supplemental raw inputs for the partial prediction information deficiencies, while at step/operation 407, the hierarchical prediction computing entity 106 obtains (e.g., from an external computing entity 102) the supplemental raw inputs. For example, the hierarchical prediction computing entity 106 may generate a synthesized voice request for supplemental raw inputs and transmit the synthesized voice request to an external computing entity 102. As another example, the hierarchical prediction computing entity 106 may generate a textual and/or visual request and transmit the synthesized voice request to an external computing entity 102. As yet another example, the hierarchical prediction computing entity 106 may automatically add an information request to a task list and/or reminder list associated with an external computing entity 102. In some embodiments, the supplemental raw inputs may comprise text data, voice data, video data, etc. In some embodiments, the supplemental raw inputs may comprise compressed data. In some embodiments, the supplemental raw inputs may comprise structured, semi-structured, and/or unstructured data.

At step/operation 409, the hierarchical prediction computing entity 106 determines whether the partial prediction has hierarchical closure. In some embodiments, the hierarchical prediction computing entity 106 determines that the partial prediction has hierarchical closure if the partial prediction includes no negative prediction values, but determines that the partial prediction does not have hierarchical closure if the partial prediction includes at least one negative prediction values. In some embodiments, the hierarchical prediction computing entity 106 determines that the partial prediction has hierarchical closure if the partial prediction includes a positive prediction value for each prediction node associated with a prediction traversal path characterizing the partial prediction (e.g., the selected prediction traversal path determined in step/operation 702 of FIG. 7), but determines that the partial prediction does not have hierarchical closure if the partial prediction includes a negative prediction value for at least one prediction node associated with a prediction traversal path characterizing the partial prediction.

If the hierarchical prediction computing entity 106 determines that the partial prediction does not have hierarchical closure (e.g., that the partial prediction has "missing" values), the hierarchical prediction computing entity 106 repeats steps/operations 405-409 to determine partial prediction information deficiencies, request supplemental raw inputs for the partial prediction information deficiencies, update the partial prediction based on the supplemental raw inputs, and again determine whether the now-updated partial prediction has hierarchical prediction. However, if the hierarchical prediction computing entity 106 determines that the partial prediction has hierarchical closure (e.g., that the partial prediction does not "missing" values), the hierarchical prediction computing entity 106 proceeds to determine the final prediction based on the partial prediction. In some embodiments, a partial prediction and/or a final prediction is a conceptually hierarchical prediction, e.g., a prediction determined based on and/or in relation to a conceptually hierarchical prediction space where one positive and/or negative prediction may necessitate another positive and/or negative prediction.

In some embodiments, the hierarchical prediction computing entity 106 requests supplemental raw inputs by transmitting a supplemental information prompt to an external computing entity 106. The supplemental information prompt may include text data, voice data, video data, etc. In some embodiments, the supplemental information prompt is a supplemental information voice prompt.

In some of those embodiments, the supplemental information voice prompt is generated using one or more supplemental information parameters (e.g., a category of disease identifier, a disease identifier, etc.), one or more semantic rules (e.g., one or more sentence formation rules), and a voice synthesis routine. In some embodiments, the one or more supplemental information parameters are determined based on the one or more partial prediction information deficiencies determined in step/operation 405. For example, the partial prediction information deficiencies may indicate a deficiency for a target laterality prediction node with respect to an arm surgery. In response, the hierarchical prediction computing entity 106 may determine a known supplemental information parameter P1 relating to arm surgery procedure type, an unknown information supplemental parameter P2 relating to right arm laterality, and another unknown information supplemental parameter P3 relating to left arm laterality. The hierarchical prediction computing entity 106 may then utilize the supplemental information parameters along with a semantic rule associated with the following sentence formation structure: "Was your [P1] related to [P2] or [P3]?" to generate the sentence "Was your arm surgery related to right arm or left arm?" The hierarchical prediction computing entity 106 may then utilize a voice synthesis routine to generate a voice prompt for the generated sentence, and subsequently transmit the generated voice prompt to an external computing entity 102, such as an external computing entity 102 associated with a medical provider.

In some embodiments, the final prediction includes one or more prediction values, each of which may correspond to one or more prediction nodes in the initial encoding hierarchy. In some embodiments, the prediction values in the final prediction correspond to real-world entities that have conceptually hierarchical relationships with one another. For example, FIG. 8 provides an operational example of a medical procedure data model 800 for various real-world entities and real-world relationships corresponding to an example medical procedure final prediction 900 depicted in FIG. 9.

As depicted in FIG. 8, the medical procedure data model 800 includes the following data objects: (i) data object 801 that indicates a top-level procedure identifier and corresponds to the prediction value 903 of the medical procedure final prediction 900; (ii) data object 802 that has a target identification relationship 811 with the top-level procedure identifier of data object 801 and corresponds to a part of the information contained in the prediction value 904 of the medical procedure final prediction 900; (iii) data object 803 that has an approach identification relationship 812 with the top-level procedure identifier of data object 801 and corresponds to the prediction value 905 of the medical procedure final prediction 900; (iv) data object 804 that has an instrument identification relationship 813 with the top-level procedure identifier of data object 801 and corresponds to the prediction value 906 of the medical procedure final prediction 900; (v) data object 805 that has a tissue identification relationship 814 with the target identifier of data object 802 and corresponds to the prediction value 902 of the medical procedure final prediction 909; and (iv) data object 806 that has a laterality identification relationship 815 with the target identifier of data object 802 and corresponds to a part of the information contained in the prediction value 904 of the medical procedure final prediction 900. Moreover, in some embodiments, given that the medical procedure data model 800 has no qualifier information, the prediction value 907 in the medical procedure final prediction 900 may be set to a value indicating absence of qualifying information.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
receiving, by one or more processors, initial raw data input originating from a computing device;

generating, by the one or more processors and based at least in part on natural language processing performed on the initial raw data input, an inferred prediction value and a prediction score for each of a plurality of prediction nodes stored within a memory storage area as an encoding hierarchy that defines hierarchical relationships among the plurality of prediction nodes;

generating, by the one or more processors and in the memory storage area, a partial code prediction data object comprising one or more values and a first null value of a partial medical code, wherein the partial code prediction data object comprises data generated based at least in part on output generated by a subset of the plurality of prediction nodes having respective prediction scores satisfying a prediction score criterion within the encoding hierarchy;

wherein the subset of the plurality of prediction nodes are linked with one another in the memory storage area along a partial prediction traversal path determined at least in part by:

automatically selecting a plurality of second prediction nodes using links defining a hierarchical dependency from a first prediction node within the memory storage area when the first null value is generated, using the first prediction node of the subset of the plurality of prediction nodes, based at least in part on output of the natural language processing performed on the initial raw data input;

determining, by the one or more processors in real-time prior to generating a final code prediction data object and based at least in part on the encoding hierarchy, a partial code prediction data deficiency for the partial code prediction data object based at least in part on the first null value of the partial code prediction data object;

generating, by the one or more processors, a data request in real-time upon determining the partial code prediction data deficiency, wherein the data request includes one or more parameters determined from the partial code prediction data deficiency;

transmitting, by the one or more processors, the data request to the computing device, causing the computing device to generate at least one of an audio output or a visual output to prompt a user associated with the computing device for supplemental raw data input based at least in part on the one or more parameters;

receiving, by the one or more processors and from the computing device, the supplemental raw data input based at least in part on the data request; and generating, by the one or more processors, the final code prediction data object, wherein the final code prediction data object is a complete medical code that comprises the one or more values and a final value replacing the first null value of the partial code prediction data object based at least in part on output of natural language processing performed on the supplemental raw data input and the partial code prediction data object.

2. The computer-implemented method of claim 1, wherein the hierarchical relationships comprise one or more predictive dependence relationships among the plurality of prediction nodes.

3. The computer-implemented method of claim 2, wherein the one or more predictive dependence relationships comprise at least one predictive dependence relationship having a necessity predictive semantic and at least one predictive dependence relationship having a disjunctive predictive semantic.

4. The computer-implemented method of claim 1, further comprising:

determining the encoding hierarchy based at least in part on the initial raw data input.

5. The computer-implemented method of claim 4, wherein determining the encoding hierarchy based at least in part on the initial raw data input comprises:

receiving one or more encoding hierarchies from the memory storage area;

for each encoding hierarchy of the one or more encoding hierarchies, determining a hierarchy prediction score based at least in part on the initial raw data input; and selecting a first encoding hierarchy of the one or more encoding hierarchies having a highest prediction score as the encoding hierarchy.

6. The computer-implemented method of claim 1, wherein the initial raw data input comprises one or more medical provider inputs.

7. The computer-implemented method of claim 1, wherein the initial raw data input comprises one or more natural language inputs.

8. The computer-implemented method of claim 1, wherein the partial prediction traversal path is a portion of a selected prediction traversal path of one or more prediction traversal paths of the encoding hierarchy, and wherein generating the partial code prediction data object comprises:

determining an ontology data object based at least in part on the initial raw data input; and determining the selected prediction traversal path of the one or more prediction traversal paths for the ontology data object.

9. The computer-implemented method of claim 8, wherein determining the ontology data object comprises:

receiving, as a part of the initial raw data input, one or more inferred prediction values;

determining, for each inferred prediction value of the one or more inferred prediction values, a value prediction score;

determining one or more reliable prediction values of the one or more inferred prediction values whose value prediction score exceeds a value prediction score threshold; and determining the ontology data object based at least in part on the one or more reliable prediction values.

10. The computer-implemented method of claim 1, further comprising:

determining the first prediction node, wherein the first prediction node has a positive prediction value;

determining the plurality of second prediction nodes, wherein the plurality of second prediction nodes are hierarchically dependent from the first prediction node;

determining a confidence score for each of a plurality of values generated corresponding to the first prediction node; and selecting a first value of the plurality of values generated corresponding to the first prediction node as having a highest confidence score.

11. The computer-implemented method of claim 1, wherein causing the computing device to generate at least one of an audio output or a visual output to prompt a user associated with the computing device for supplemental raw data input based at least in part on the one or more parameters comprises:

causing the computing device to generate an audio output using the one or more parameters, one or more semantic rules, and a voice synthesis routine.

12. The computer-implemented method of claim 1, further comprising:

determining a hierarchical closure indication for the final code prediction data object based at least in part on the final code prediction data object and the encoding hierarchy;

determining whether the hierarchical closure indication indicates that the final code prediction data object has hierarchical closure; and based at least in part on the determining whether the hierarchical closure indication indicates that the final code prediction data object has hierarchical closure:

in response to determining that the hierarchical closure indication indicates that the final code prediction data object has hierarchical closure, transmitting the final code prediction data object to a recipient computing entity; or in response to determining that the hierarchical closure indication indicates that the final code prediction data object does not have hierarchical closure, determining one or more final prediction data deficiencies based at least in part on the final code prediction data object and the encoding hierarchy, generating a supplemental audio output using one or more supplemental data parameters, one or more semantic rules, and a voice synthesis routine, and transmitting the supplemental audio output to a data provider computing entity.

13. The computer-implemented method of claim 1, wherein the encoding hierarchy is a medical code hierarchy and wherein the partial code prediction data object reflects information deficiencies in generating a medical code.

14. The computer-implemented method of claim 1, wherein the one or more parameters determined from the partial code prediction data deficiency identifies supplemental information needed to generate a complete medical code as the final code prediction data object.

15. An apparatus comprising at least one processor and at least one non-transitory memory comprising program code, wherein the at least one non-transitory memory and the program code are configured to, with the at least one processor, cause the apparatus to:

receive an initial raw data input originating from a computing device;

generate, based at least in part on natural language processing performed on the initial raw data input, an inferred prediction value and a prediction score for each of a plurality of prediction nodes stored within the at least one non-transitory memory as an encoding hierarchy that defines hierarchical relationships among the plurality of prediction nodes;

generate, in the at least one non-transitory memory, a partial code prediction data object comprising one or more values and a first null value of a partial medical code, wherein the partial code prediction data object comprises data generated based at least in part on output generated by a subset of the plurality of prediction nodes having respective prediction scores satisfying a prediction score criterion within the encoding hierarchy;

wherein the subset of the plurality of prediction nodes are linked with one another in the at least one non-transitory memory along a partial prediction traversal path and wherein to determine the partial prediction traversal path, the at least one non-transitory memory and the program code are configured to, with the at least one processor, cause the apparatus to:

automatically select a plurality of second prediction nodes using links defining a hierarchical dependency from a first prediction node within the at least one non-transitory memory when the first null value is generated, using the first prediction node of the subset of the plurality of prediction nodes, based at least in part on output of the natural language processing performed on the initial raw data input;

determine, in real-time before the apparatus generates a final code prediction data object and based at least in part on the encoding hierarchy, a partial code prediction data deficiency for the partial code prediction data object based at least in part on the first null value of the partial code prediction data object;

generate a data request in real-time when the apparatus determines the partial code prediction data deficiency, wherein the data request includes one or more parameters determined from the partial code prediction data deficiency;

transmit the data request to the computing device to cause the computing device to generate at least one of an audio output or a visual output to prompt a user associated with the computing device for supplemental raw data input based at least in part on the one or more parameters;

receive the supplemental raw data input from the computing device based at least in part on the data request; and generate the final code prediction data object, wherein the final code prediction data object is a complete medical code that comprises the one or more values and a final value replacing the first null value of the partial code prediction data object based at least in part on output of natural language processing performed on the supplemental raw data input and the partial code prediction data object.

16. The apparatus of claim 15, wherein the partial prediction traversal path is a portion of a selected prediction traversal path of one or more prediction traversal paths of the encoding hierarchy, and wherein to generate the partial code prediction data object, the apparatus is further configured to:

determine an ontology data object based at least in part on the initial raw data input; and determine the selected prediction traversal path of the one or more prediction traversal paths for the ontology data object.

17. The apparatus of claim 16, wherein to determine the ontology data object, the apparatus is further configured to:

receive, as a part of the initial raw data input, one or more inferred prediction values;

determine, for each inferred prediction value of the one or more inferred prediction values, a value prediction score;

determine one or more reliable prediction values of the one or more inferred prediction values whose value prediction score exceeds a value prediction score threshold; and determine the ontology data object based at least in part on the one or more reliable prediction values.

18. The apparatus of claim 15, wherein the apparatus is further configured to:

determine the first prediction node, wherein the first prediction node has a positive prediction value, determine the plurality of second prediction nodes, wherein the plurality of second prediction nodes are hierarchically dependent from the first prediction node, determine a confidence score for each of a plurality of values generated corresponding to the first prediction node; and select a first value of the plurality of values generated corresponding to the first prediction node as having a highest confidence.

19. The apparatus of claim 15, wherein the at least one non-transitory memory and the program code are further configured to, with the at least one processor, cause the apparatus to:

determine a hierarchical closure indication for the final code prediction data object based at least in part on the final code prediction data object and the encoding hierarchy;

determine whether the hierarchical closure indication indicates that the final code prediction data object has hierarchical closure; and based at least in part on whether the hierarchical closure indication indicates that the final code prediction data object has hierarchical closure:

when the apparatus determines that the hierarchical closure indication indicates that the final code prediction data object has hierarchical closure, transmit the final code prediction data object to a recipient computing entity; or when the apparatus determines that the hierarchical closure indication indicates that the final code prediction data object does not have hierarchical closure, determine one or more final prediction data deficiencies based at least in part on the final code prediction data object and the encoding hierarchy, generate a supplemental data voice prompt using one or more supplemental data parameters, one or more semantic rules, and a voice synthesis routine, and transmit the supplemental data voice prompt to a data provider computing entity.

20. A non-transitory computer storage medium comprising instructions configured to cause one or more processors to at least:

receive an initial raw data input originating from a computing device;

generate, based at least in part on natural language processing performed on the initial raw data input, an inferred prediction value and a prediction score for each of a plurality of prediction nodes stored within a memory as an encoding hierarchy that defines hierarchical relationships among the plurality of prediction nodes;

generate, in the memory, a partial code prediction data object comprising one or more values and a first null value of a partial medical code, wherein the partial code prediction data object comprises data generated based at least in part on output generated by a subset of the plurality of prediction nodes having respective prediction scores satisfying a prediction score criterion within the encoding hierarchy;

wherein the subset of the plurality of prediction nodes are linked with one another in the memory along a partial prediction traversal path and wherein to determine the partial prediction traversal path, the instructions are further configured to cause one or more processors to at least:

automatically select a plurality of second prediction nodes using links defining a hierarchical dependency from a first prediction node within the memory when the first null value is generated, using the first prediction node of the subset of the plurality of prediction nodes, based at least in part on output of the natural language processing performed on the initial raw data input;

determine, in real-time before the one or more processors generate a final code prediction data object and based at least in part on the encoding hierarchy, a partial code prediction data deficiency for the partial code prediction data object based at least in part on the first null value of the partial code prediction data object;

generate a data request in real-time when the one or more processors determine the partial code prediction data deficiency, wherein the data request includes one or more parameters determined from the partial code prediction data deficiency;

transmit the data request to the computing device to cause the computing device to generate at least one of an audio output or a visual output to prompt a user associated with the computing device for supplemental raw data input based at least in part on the one or more parameters;

receive the supplemental raw data input from the computing device based at least in part on the data request; and generate the final code prediction data object, wherein the final code prediction data object is a complete medical code that comprises the one or more values and a final value replacing the first null value of the partial code prediction data object based at least in part on natural language processing performed on the supplemental raw data input and the partial code prediction data object.

21. The non-transitory computer storage medium of claim 20, wherein the partial prediction traversal path is a portion of a selected prediction traversal path of one or more prediction traversal paths of the encoding hierarchy, and wherein to generate the partial code prediction data object, the instructions are further configured to cause one or more processors to at least:

determine an ontology data object based at least in part on the initial raw data input; and determine the selected prediction traversal path of the one or more prediction traversal paths for the ontology data object.

22. The non-transitory computer storage medium of claim 21, wherein to determine the ontology data object the instructions are further configured to cause one or more processors to at least:

process the initial raw data input to receive one or more inferred prediction values;

determine, for each inferred prediction value of the one or more inferred prediction values, a value prediction score;

determine one or more reliable prediction values of the one or more inferred prediction values whose value prediction score exceeds a value prediction score threshold; and determine the ontology data object based at least in part on the one or more reliable prediction values.

23. The non-transitory computer storage medium of claim 20, wherein the instructions are further configured to cause one or more processors to at least:

determine the first prediction node, wherein the first prediction node has a positive prediction value, determine the plurality of second prediction nodes, wherein the plurality of second prediction nodes are hierarchically dependent from the first prediction node, determine a confidence score for each of a plurality of values generated corresponding to the first prediction node; and select a first value of the plurality of values generated corresponding to the first prediction node as having a highest confidence score.

24. The non-transitory computer storage medium of claim 20, wherein the instructions are further configured to cause one or more processors to at least:

determine a hierarchical closure indication for the final code prediction data object based at least in part on the final code prediction data object and the encoding hierarchy;

determine whether the hierarchical closure indication indicates that the final code prediction data object has hierarchical closure; and based at least in part on the determining whether the hierarchical closure indication indicates that the final code prediction data object has hierarchical closure:

in response to determining that the hierarchical closure indication indicates that the final code prediction data object has hierarchical closure, transmit the final code prediction data object to a recipient computing entity; or in response to determining that the hierarchical closure indication indicates that the final code prediction data object does not have hierarchical closure, determine one or more final prediction data deficiencies based at least in part on the final code prediction data object and the encoding hierarchy, generate a supplemental data voice prompt using one or more supplemental data parameters, one or more semantic rules, and a voice synthesis routine, and transmit the supplemental data voice prompt to a data provider computing entity.

* * * * *